United States Patent
Kuroda et al.

(10) Patent No.: US 6,858,244 B2
(45) Date of Patent: Feb. 22, 2005

(54) SEASONING COMPOSITIONS, FOODS AND DRINKS WITH THE USE THEREOF AND PROCESSES FOR PRODUCING THE SAME

(75) Inventors: Motonao Kuroda, Kawasaki (JP); Fumihiko Odashima, Tokyo (JP); Toshihito Seki, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 10/277,806

(22) Filed: Oct. 23, 2002

(65) Prior Publication Data

US 2003/0198723 A1 Oct. 23, 2003

Related U.S. Application Data

(63) Continuation of application No. PCT/JP01/03174, filed on Apr. 12, 2001.

(30) Foreign Application Priority Data

| Apr. 24, 2000 | (JP) | 2000-122169 |
| Sep. 29, 2000 | (JP) | 2000-297859 |
| Mar. 29, 2001 | (JP) | 2001-095859 |

(51) Int. Cl.$^7$ ................................................. A23L 1/22
(52) U.S. Cl. ...................... 426/534; 426/648; 426/649; 426/650
(58) Field of Search ................................. 426/533, 534, 426/638, 648, 649, 650, 804, 806

(56) References Cited

U.S. PATENT DOCUMENTS 4,243,691 A * 1/1981 Mohlenkamp et al. ...... 426/649

FOREIGN PATENT DOCUMENTS

| JP | 60-153773 | 8/1985 |
| JP | 62-003758 | 1/1987 |
| JP | 62-032863 | 2/1987 |
| JP | 08-256702 | 10/1996 |

OTHER PUBLICATIONS

Hawley, G.G., The Condensed Chemical Dictionary, Tenth Edition, 1981, Van Nostrand Reinhold Company, New York, p. 562.*

* cited by examiner

*Primary Examiner*—Leslie Wong
(74) *Attorney, Agent, or Firm*—Oblon, Spivak, McClelland, Maier & Neustadt, P.C.

(57) ABSTRACT

The present invention relates to a seasoning composition that suppresses unpleasant acidic tastes or acidic smells present in or generated by foods and drinks, especially foods, and a process for producing the same.

33 Claims, No Drawings

SEASONING COMPOSITIONS, FOODS AND DRINKS WITH THE USE THEREOF AND PROCESSES FOR PRODUCING THE SAME

CROSS REFERENCE TO RELATED APPLICATIONS

The present application is a continuation application claiming priority to PCT International Application No. PCT/JP01/03174 filed on Apr. 12, 2001, which is hereby incorporated by reference in its entirety. In addition, the present application claims priority to Japanese Patent Application No. 2000-122169, filed on Apr. 24, 2000, Japanese Patent Application No. 2000-297859, filed on Sep. 29, 2000, and Japanese Patent Application No. 2001-095859, filed on Mar. 29, 2001, all of which are hereby incorporated by reference in their entirety.

BACKGROUND OF THE INVENTION

1. Field of the Invention

The present invention relates to a seasoning composition that suppresses unpleasant acidic tastes or acidic smells present in or generated by foods and drinks, especially foods. In particular, the present invention relates to seasoning compositions, which impart these properties on pre-cooked daily-foods (i.e., from delicatessens). In addition, the present invention relates to foods and drinks that have excellent preservation properties and have a favorable taste, which are obtained by incorporating the seasoning composition provided herein or the ingredients contained in the seasoning composition and a process for producing the same.

2. Discussion of the Background

Common methods of prolonging the edible period of various pre-cooked daily-foods include employing acidic materials, such as acetic acid, lactic acid, citric acid, phosphoric acid, etc., and a pH adjustor containing sodium acetate as main ingredients. Although acidic materials or pH adjustors can provide improved keeping properties to the pre-cooked daily-foods, preparations using sodium acetate, for example, have involved a problem in that an acidic taste or an acidic smell, such as an acetic acid smell, is imparted resulting in a loss of taste or flavor of the food materials per se.

In order to address these problems, methods for suppressing acidic tastes have been proposed for situations in which acidic materials or sodium acetate-type preparations are used, which entail incorporating sweeteners having a high potency of sweetness, such as sucralose, aspartame, acesulfame K, etc. However, in these ordinary methods, the foregoing unpleasant "acidic taste" and "acidic smell," such as "acetic acid smell," cannot be satisfactorily suppressed.

Accordingly, there remains a critical need for food preservatives and/or seasonings that suppress unpleasant acidic tastes and/or smells.

SUMMARY OF THE INVENTION

Accordingly, it is an object of the present invention to provide a seasoning composition which can suppress unpleasant acidic tastes and/or acidic smells, typically associated with acetic acid or a similar acid, present in or generated by foods and drinks, especially pre-cooked daily-foods.

Another object of the present invention is to provide foods and drinks, in particular pre-cooked daily-foods, that have excellent preservation properties and have a favorable taste, including flavor, which are obtained by incorporating such a seasoning composition or the ingredients thereof and a process for producing the same.

Such an object may be obtained by a seasoning composition containing, in a weight ratio, 0.01 to 0.5 of sugar alcohol(s), 0.05 to 1.0 of glutamic acid, 0.001 to 0.2 of potassium and 0.0005 to 0.2 of inosinic acid per 100 of foods or drinks (weight free from the following seasoning composition of the present invention or the ingredients thereof).

In another object of the present invention is the seasoning composition above that further contains an acetate ion in a weight ratio of 0.01 to 1.5 when the weight ratio of the sugar alcohol(s) is 0.01 to 0.5.

In a further object, the seasoning composition contains sulfur-containing amino acid(s) and/or sulfur-containing peptide(s) (also referred to as a "sulfur-containing compound" in the present invention) in a weight ratio of 0.0001 to 0.1 in terms of sulfur (sulfur molecule) contained as an ingredient when the weight ratio of the sugar alcohol(s) is 0.01 to 0.5.

Still a further object of the present invention is methods of preparing foods containing the seasoning composition described herein.

The above objects highlight certain aspects of the invention. Additional objects, aspects and embodiments of the invention are found in the following detailed description of the invention.

DETAILED DESCRIPTION OF THE INVENTION

Unless specifically defined, all technical and scientific terms used herein have the same meaning as commonly understood in the culinary arts.

All methods and materials similar or equivalent to those described herein can be used in the practice or testing of the present invention, with suitable methods and materials being described herein. All publications, patent applications, patents, and other references mentioned herein are incorporated by reference in their entirety. In case of conflict, the present specification, including definitions, will control. Further, the materials, methods, and examples are illustrative only and are not intended to be limiting, unless otherwise specified.

The present invention is based in part on the Inventor's surprising discovery that the problems, such as acidic tastes and/or an acidic smells, associated with commonly employed food preservative compositions that result in a loss of taste or flavor of the food materials can be overcome by adding the seasoning composition of the present invention to foods or drinks that require transient or long term storage, especially pre-cooked daily-foods.

In a preferred embodiment, the seasoning composition of the present invention contains, in a weight ratio, 0.01 to 0.5 of sugar alcohol(s), 0.05 to 1.0 of glutamic acid, 0.001 to 0.2 of potassium and 0.0005 to 0.2 of inosinic acid (i.e., disodium inosinate) per 100 of foods or drinks (weight free from the following seasoning composition of the present invention or the ingredients thereof).

In a particular preferred embodiment, the desired food and drink properties, can be obtained by incorporating into various foods and drinks a seasoning composition containing, based on a weight of the food or drink of 100 (weight free from the following seasoning composition of the present invention or the ingredients thereof), 0.01 to 0.5 of sugar alcohol(s), 0.05 to 1.0 of glutamic acid, 0.001 to 0.2, preferably 0.005 to 0.2 of potassium and 0.0005 to 0.2, preferably 0.001 to 0.2 of inosinic acid.

In another embodiment of the present invention, foods and/or drinks, especially pre-cooked daily-foods, having excellent preservation properties and a favorable taste (including flavor) with a suppressed acidic taste and/or acidic smell can be produced by incorporating therein, in a weight ratio, 2 to 50, preferably 3 to 30, more preferably 5 to 30, particularly preferably 5 to 15 of sugar alcohol(s), 15 to 250, preferably 15 to 220, more preferably 22 to 220, particularly preferably 25 to 150, most preferably 30 to 100 of glutamic acid, 1 to 50, preferably 2 to 40, more preferably 3 to 30 of potassium, 0.2 to 20, preferably 0.3 to 15, more preferably 0.5 to 10, particularly preferably 0.6 to 8 of inosinic acid, when the weight of the acetate ion incorporated or present in foods or drinks is rated as 100.

The seasoning composition of the present invention may further contain, in a weight ratio, 0.01 to 30, preferably 0.1 to 20, or more preferably 0.5 to 15 of sulfur-containing amino acid(s) and/or sulfur-containing peptide(s) in terms of the sulfur molecule, when the weight of the acetate ion incorporated or present in foods or drinks is rated as 100. In this case, the incorporation of the sulfur-containing amino acid(s) and/or the sulfur-containing peptide(s) is preferable to further alleviate the acidic smell. It has also been found more preferable that the sulfur-containing amino acid(s) and/or the sulfur-containing peptide(s) is incorporated in a weight ratio of 0.0001 to 0.1 in terms of a sulfur molecule therein (based on the total weight of the sulfur content (ingredient) therein) per 100 of foods or drinks (weight free from the following seasoning composition of the present invention or the ingredients thereof).

Accordingly one embodiment of the present invention is a seasoning composition containing, in a weight ratio, 0.01 to 0.5 of sugar alcohol(s), 0.05 to 1.0 of glutamic acid, 0.001 to 0.2 of potassium and 0.0005 to 0.2 of inosinic acid. This seasoning may further contain an acetate ion, such as acetic acid, sodium acetate, etc. When an acetate ion is present, the acetate ion is in a weight ratio of 0.01 to 1.5, preferably 0.02 to 1.0 when the weight ratio of the sugar alcohol(s) is 0.01 to 0.5. Further, the seasoning composition of the present invention may also contain sulfur-containing amino acid(s) and/or sulfur-containing peptide(s) (also referred to as a "sulfur-containing compound" in the present invention). When a sulfur-containing compound is present, the sulfur-containing compound is in a weight ratio of 0.0001 to 0.1, preferably 0.0003 to 0.01, more preferably 0.0005 to 0.005 in terms of sulfur (sulfur molecule) contained as an ingredient when the weight ratio of the sugar alcohol(s) is 0.01 to 0.5.

In the foregoing composition, the acetate ion can be present or incorporated in the form of acetic acid or sodium acetate.

When an acetate ion is present, the seasoning composition of the present invention preferably contains, in a weight ratio, 2 to 50 of sugar alcohol(s), 15 to 250 of glutamic acid, 1 to 50 of potassium and 0.2 to 20 of inosinic acid, relative to 100 of the acetate ion (weight of a moiety corresponding to an acetate ion: $CH_3CO_2^-$ in the form of a compound such as acetic acid, a salt of acetate (i.e., an acetic acid salt)). In this case, it is also possible to contain, in a weight ratio, preferably 0.01 to 30, more preferably 0.02 to 20, most preferably 0.05 to 5 of sulfur-containing amino acid(s) and/or sulfur-containing peptide(s) in terms of sulfur (sulfur molecule) contained as an ingredient relative to 100 of the acetate ion.

When the acetate is in the form of sodium acetate, it is particularly preferable that the seasoning composition contain, in a weight ratio, 2 to 20 of sugar alcohol(s), 15 to 150 of glutamic acid, 2 to 20 of potassium and 0.2 to 10 of inosinic acid, relative to 100 of sodium acetate (total weight of an acetate ion present and the equimolar amount of a sodium ion). In this case, it is also possible to contain, in a weight ratio, preferably 0.01 to 30, more preferably 0.02 to 20, most preferably 0.05 to 5 of sulfur-containing amino acid(s) and/or sulfur-containing peptide(s) in terms of a sulfur molecule (the forgoing sulfur ingredient) relative to 100 of sodium acetate.

In a particularly preferred embodiment of the present invention is a seasoning composition containing, in a weight ratio, 0.05 to 1.0 of glutamic acid, 0.005 to 0.2 of potassium and 0.001 to 0.2 of inosinic acid, relative to 0.01 to 0.5 of sugar alcohol(s) per 100 of foods or drinks (weight free from the following seasoning composition of the present invention or the ingredients thereof).

Another preferred embodiment of the present invention is a seasoning composition containing, in a weight ratio, 0.05 to 1.5 of sodium acetate, 0.05 to 1.0 of glutamic acid, 0.005 to 0.2 of potassium and 0.001 to 0.2 of inosinic acid, relative to 0.01 to 0.5 of sugar alcohol(s) per 100 of foods or drinks (weight free from the following seasoning composition of the present invention or the ingredients thereof).

The seasoning composition of the present invention may contain additional ingredients in addition to the foregoing ingredients. One or more other ingredients may be incorporated so long as the incorporation thereof is not detrimental to the objects of the present invention.

The term "sugar alcohol" within the context of the present invention includes: sorbitol, maltitol, paratinitol, mannitol, xylitol, a partially hydrolyzed reduced starch, or other known equivalents. Further within the context of the present invention, the term "sugar alcohol" includes combinations of one or more of the foregoing sugar alcohols in the same seasoning composition. It is also possible to use foods containing the foregoing sugar alcohol(s) at high concentrations, such as an extract.

The term "glutamic acid" within the context of the present invention embraces glutamic acid in a free form, as well as the salt form of glutamic acid. Moreover, with respect to an optical isomer, it is preferable to use an L-isomer; however, the D-isomer is not precluded from use. When calculating the range of the weight ratio if the salt form of glutamic acid is used, it is advisable to contain the same within the foregoing numerical range in terms of the free form. Particularly preferred forms of glutamic acid that are suitable for use in the present invention includes one or more of: L-glutamic acid, sodium L-glutamate (monosodium salt), potassium L-glutamate, calcium L-glutamate, or other known equivalents.

Within the context of the present invention, potassium can be used in the form of a compound or an ion. Accordingly, potassium can be used in the form of a compound containing a potassium ingredient (i.e., in the form of an ion) usable for foods and drinks, or preferably in the form of a salt. The form of the compound is not particularly limited, and any form is available. As typical examples, potassium chloride, an anhydride and a hydrate of monopotassium dihydrogenphosphate, an anhydride and a hydrate of dipotassium monohydrogenphosphate, potassium hydroxide, potassium glutamate and other known equivalents may be mentioned. In the calculation of the range of the weight ratio described above, it is advisable to contain the same within the foregoing numerical range in terms of a potassium molecule (molecular potassium).

In the present invention, the inosinic acid may be used in the free form as well as that in the salt form. When the inosinic acid salt is used in accordance with the present invention, one or more of the following examples may be used: sodium inosinate, disodium inosinate, potassium inosinate, calcium inosinate, histidine inosinate and other known equivalents. In the calculation of the range of the weight ratio in case of using the same in the salt form, it is advisable to contain the same within the foregoing numerical range in terms of the free form.

The sulfur-containing amino acid(s) and/or the sulfur-containing peptide(s) that can also be used in the present invention may be in a free form, as well as in a salt form. Further, it is advisable to use an L-isomer as the amino acid constituting the sulfur-containing amino acid or the sulfur-containing peptide. When using a salt form of the sulfur-containing amino acid, it is possible to incorporate or add, for example, cysteine, its hydrochloride, cystine, methionine, a hydrolyzed protein (HP; protein hydrolysate) containing the same and other recognized equivalents. Further, in case of using the sulfur-containing peptide in the salt form, it is possible to add, for example, γ-glutamylcysteine, glutathione, a glutathione-containing yeast extract and other known equivalents. In the calculation of the range of the weight ratio when using the sulfur-containing amino acid(s) and/or the sulfur-containing peptide(s), it is defined on the basis of the weight of the sulfur ingredient contained therein. It is advisable that the sulfur-containing amino acid(s) and/or the sulfur-containing peptide(s) is contained within the foregoing numerical range in terms of the sulfur ingredient (sulfur molecule; molecular sulfur) contained therein.

The acetate ion used in the present invention is not particularly limited. It can be used in the form of acetic acid or a salt of acetate. For example, natural vinegars, such as grain vinegars, and acetic acid can be used. Further, acetic acid salts (for example, sodium acetate) typified by a commercial pH adjustor are also available. Within the context of the present invention, it contains an acetate ion in an isolated (dissociated) state. However, it does not necessarily mean only an ion present in the form of an isolated acetate ion ($CH_3COO^-$). The term "acetate ion" is indicated only for facilitating definition of the numerical range employed in the weight ratio that shows the composition in the present invention. As the acetate ion described above, the form of sodium acetate is preferable.

According to another embodiment of the present invention is a food or drink containing, in a weight ratio, 0.01 to 0.5 of sugar alcohol(s), 0.05 to 1.0 of glutamic acid, 0.001 to 0.2 of potassium and 0.0005 to 0.2 of inosinic acid, when the weight of the food or drink is rated as 100 (weight before incorporating the seasoning composition of the present invention or the ingredients thereof).

In this case, an acetate ion may be present, preferably in a weight ratio of 0.01 to 1.5 relative to 100 of the foods or drinks by incorporation, addition or the like thereof.

Further, it is advisable to add to the food or drink a sulfur-containing amino acid(s) and/or the sulfur-containing peptide(s) in a weight ratio of sulfur-containing amino acid(s) and/or the sulfur-containing peptide(s) in a weight ratio of 0.0001 to 0.1 in terms of a sulfur molecule relative to 100 of the foods or drinks.

With respect to a preferable composition of the foods and drinks in the present invention, foods and drinks containing, in a weight ratio, 3 to 30 of sugar alcohol(s), 22 to 220 of glutamic acid, 3 to 30 of potassium and 0.3 to 15 of inosinic acid, relative to 100 of the acetate ion can be mentioned.

As another preferable composition, foods and drinks containing, in a weight ratio, 2 to 20 of sugar alcohol(s), 15 to 150 of glutamic acid, 2 to 20 of potassium and 0.2 to 10 of inosinic acid, relative to 100 of sodium acetate can be mentioned.

In the invention of the foods and drinks, the ingredients (sugar alcohol(s), an acetate ion, glutamic acid, potassium, inosinic acid, and sulfur-containing amino acid(s) and/or sulfur-containing peptide(s)) of the seasoning (flavoring material) used and the calculation directed to the numerical range on the composition thereof are as described in the seasoning composition of the present invention.

In still another embodiment, the present invention provides a process for producing foods or drinks (i.e., the foods or drinks of the present invention described above), containing the seasoning compositions of the present invention described above or predetermined ingredients contained in the seasoning compositions, by incorporated the seasoning composition, or ingredients thereof, into the food or drink during production thereof, preferably in a predetermined weight ratio.

According to yet another embodiment, the present invention provides a method for imparting an improved taste (including flavor) to foods or drinks, by incorporating therein the seasoning composition of the present invention or the ingredients thereof during production thereof preferably in a predetermined weight ratio.

With respect to the foods and drinks described above in the present invention, foods and drinks improved in acidic taste or acidic smell can be provided. In addition, the foods and drinks obtained in accordance with the present invention possess excellent preservation properties. Especially, food and drinks in which sulfur-containing amino acid(s) and/or the sulfur-containing peptide(s) have been incorporated possess additional improved effects, such as the effect against the acidic smell. Further, the foods and drinks of the present invention are suitable as pre-cooked daily-foods.

In the present invention, foods and drinks, especially foods to which the seasoning composition of the present invention is applied are of a wide range, including Japanese cooked foods (boiled foods), such as nikujaga (boiled meat and potato), chikuzen-ni (boiled Japanese vegetables & chicken) or recognized foods of a similar type; deep-fried foods, for example, kara-age (deep fried chicken) and pork cutlet; Japanese pre-cooked foods, such as tamagoyaki (Japanese omelet; fried egg), baked fish or other recognized pre-cooked foods; Chinese foods, such as chuka-don, cha-han (fried rice), mabo-dofu, happo-sai, gyoza or other members of this food class; and Western foods, such as curry, beef stew, white stew, steak or other known members of this very broad class of foods. Especially, it can preferably be applied to pre-cooked daily-foods, such as foods found in delicatessens, and processed foods.

The seasoning composition of the present invention can also be used in the form of seasonings (flavoring materials) for soup, sauce (basting), various seasoning sauces, ketchup, dressings and others foods in need thereof.

The present invention can also be applied to onigiri (rice ball), rice foods (boiled rice foods) for lunch (a box lunch), rice foods such as pilaf, and the like.

It should be recognized that the amounts or concentrations of an acetate ion, such as sodium acetate or the like, sugar alcohol(s), glutamic acid, potassium and inosinic acid as ingredients of a seasoning composition to be added for producing foods or drinks having excellent preservation properties and having a favorable taste (including flavor), vary with the food or drink in which these ingredients are used in or applied to. However, an appropriate composition and appropriate use amounts can easily be determined through experimentation using the present application as a guide.

Having generally described this invention, a further understanding can be obtained by reference to certain specific examples, which are provided herein for purposes of illustration only, and are not intended to be limiting unless otherwise specified.

EXAMPLES

Experimental Example 1

The required conditions to provide foods having excellent preservation properties and having a favorable taste (including flavor) were studied by the following method. In the evaluation system, a boiled bamboo shoot was used according to the recipes shown in Table 1.

Specifically, sample A is a non-addition product and sample B is a product with the addition of a sodium acetate preparation. Salad Keep-80 (containing 40% of sodium acetate) made by Okuno Chemical Industries Co., Ltd. was used as a sodium acetate preparation. A water-boiled bamboo shoot was cut to a width of approximately 5 mm, and then pre-boiled in a boiling bath for 2 minutes. The raw ingredients of seasoning solutions A-B (Table 1) were mixed in a pot, and the mixtures were heated. After boiling, the water-boiled bamboo shoot was added to the seasoning solutions and heated under gentle boiling conditions for 10 minutes to obtain cooked (boiled) bamboo shoot samples. To the seasoning solution of sample B (Table 1), a sugar alcohol, sodium glutamate, potassium, disodium inosinate and glutathione were added at various concentrations to obtain a cooked (boiled) food. The resulting various cooked foods were organoleptically evaluated by 2 panelists. The results of this experiment appear in Table 2.

The strength of the acidic taste was evaluated according to 5 grades from − (having no acidic taste) to ++++ (having quite a strong acidic taste). As a baseline, the strength of an acidic taste of sample A was estimated as − (having no acidic taste), and a strength of an acidic taste of sample B as ++++ (having quite a strong acidic taste). Reference is given to "Sensory Evaluation of Food" by Harry T. Lawless and Hidegarde Heymann (Aspen Publishers, Inc., Gaithersburg, Md., pp. 208–264) for a detailed description of the five-point evaluation method employed herein. As shown in Table 2, it was determined that the addition of a sugar alcohol (sorbitol), glutamic acid, potassium and disodium inosinate was indispensable for suppressing the acidic taste of the cooked food of the bamboo shoot (the boiled bamboo shoot). Further, the addition of a sulfur-containing amino acid or peptide further suppressed the acidic smell. Moreover, it was confirmed that the acidic taste could efficiently be suppressed by incorporating, in a weight ratio, 2 to 50 of sugar alcohol(s), 15 to 200 of glutamic acid, 1 to 50 of potassium and 0.2 to 20 of inosinic acid when a weight of an acetate ion was rated as 100.

TABLE 1

| Raw ingredients | | Sample A | Sample B |
| --- | --- | --- | --- |
| water-boiled bamboo shoot | | 100 g | 100 g |
| Seasoning solution | granulated sugar | 4.5 | 4.5 |
| | sake (rice wine) | 4.5 | 4.5 |
| | table salt | 1.8 | 0.8 |
| | Salad Keep-80 | — | 2.5 |
| | water | 89.2 | 86.7 |

TABLE 2

| | Amount (mg) | | | | | Concentration based on all raw ingredients (mg/100 g) | | | | | Strength of | Strength of |
| --- | --- | --- | --- | --- | --- | --- | --- | --- | --- | --- | --- | --- |
| Run | sorbitol | MSG | KCl | IN | glutathione | sorbitol | Glu | potassium | IMP | S | acidic taste | acidic smell |
| 1 | 0 | 0 | 0 | 0 | 0 | 0 | 0 | 0 | 0 | 0 | ++++ | ++++ |
| 2 | 42 | 340 | 66 | 10 | 10 | 21 | 136 | 16 | 3.3 | 0.5 | − | + |
| 3 | 0 | 340 | 66 | 10 | 10 | 0 | 136 | 16 | 3.3 | 0.5 | ++ | + |
| 4 | 42 | 0 | 66 | 10 | 10 | 21 | 0 | 16 | 3.3 | 0.5 | ++ | + |
| 5 | 42 | 340 | 0 | 10 | 10 | 21 | 136 | 0 | 3.3 | 0.5 | + | + |
| 6 | 42 | 340 | 66 | 0 | 10 | 21 | 136 | 16 | 0 | 0.5 | ++ | + |
| 7 | 42 | 340 | 66 | 10 | 0 | 21 | 136 | 16 | 3.3 | 0 | + | +++ |
| 8 | 11 | 85 | 17 | 2.5 | 2.5 | 5.5 | 34 | 4 | 0.8 | 0.13 | − | + |
| 9 | 21 | 170 | 33 | 5 | 5 | 10.5 | 68 | 8 | 1.7 | 0.26 | − | + |
| 10 | 33 | 255 | 44 | 7.5 | 7.5 | 16.5 | 102 | 12 | 2.5 | 0.39 | − | + |
| 11 | 63 | 510 | 99 | 15 | 15 | 21.5 | 204 | 24 | 5 | 0.78 | − | − |
| 12 | 84 | 680 | 132 | 20 | 20 | 42 | 272 | 32 | 6.6 | 1.04 | − | − |
| 13 | 11 | 340 | 66 | 10 | 10 | 5.5 | 136 | 16 | 3.3 | 0.5 | + | + |
| 14 | 21 | 340 | 66 | 10 | 10 | 10.5 | 136 | 16 | 3.3 | 0.5 | − | + |
| 15 | 84 | 340 | 66 | 10 | 10 | 42 | 136 | 16 | 3.3 | 0.5 | − | + |
| 16 | 126 | 340 | 66 | 10 | 10 | 63 | 136 | 16 | 3.3 | 0.5 | − | + |
| 17 | 168 | 340 | 66 | 10 | 10 | 84 | 136 | 16 | 3.3 | 0.5 | − | + |
| 18 | 42 | 85 | 66 | 10 | 10 | 21 | 34 | 16 | 3.3 | 0.5 | + | + |
| 19 | 42 | 170 | 66 | 10 | 10 | 21 | 68 | 16 | 3.3 | 0.5 | − | + |
| 20 | 42 | 680 | 66 | 10 | 10 | 21 | 272 | 16 | 3.3 | 0.5 | − | + |
| 21 | 42 | 1360 | 66 | 10 | 10 | 21 | 544 | 16 | 3.3 | 0.5 | − | + |
| 22 | 42 | 340 | 17 | 10 | 10 | 21 | 136 | 4 | 3.3 | 0.5 | ++ | + |
| 23 | 42 | 340 | 33 | 10 | 10 | 21 | 136 | 8 | 3.3 | 0.5 | − | + |
| 24 | 42 | 340 | 132 | 10 | 10 | 21 | 136 | 32 | 3.3 | 0.5 | − | + |

TABLE 2-continued

| | Amount (mg) | | | | | Concentration based on all raw ingredients (mg/100 g) | | | | | Strength of | Strength of |
|---|---|---|---|---|---|---|---|---|---|---|---|---|
| Run | sorbitol | MSG | KCl | IN | glutathione | sorbitol | Glu | potassium | IMP | S | acidic taste | acidic smell |
| 25 | 42 | 340 | 264 | 10 | 10 | 21 | 136 | 64 | 3.3 | 0.5 | − | + |
| 26 | 42 | 340 | 66 | 2.5 | 10 | 21 | 136 | 16 | 0.8 | 0.5 | + | + |
| 27 | 42 | 340 | 66 | 5 | 10 | 21 | 136 | 16 | 1.7 | 0.5 | − | + |
| 28 | 42 | 340 | 66 | 20 | 10 | 21 | 136 | 16 | 6.6 | 0.5 | − | + |
| 29 | 42 | 340 | 66 | 40 | 10 | 21 | 136 | 16 | 13.2 | 0.5 | − | + |
| 30 | 42 | 340 | 66 | 60 | 10 | 21 | 136 | 16 | 19.8 | 0.5 | − | + |
| 31 | 42 | 340 | 66 | 80 | 10 | 21 | 136 | 16 | 26.4 | 0.5 | − | + |
| 32 | 42 | 340 | 66 | 10 | 0.2 | 21 | 136 | 16 | 3.3 | 0.01 | + | ++ |
| 33 | 42 | 340 | 66 | 10 | 5 | 21 | 136 | 16 | 3.3 | 0.26 | − | + |
| 34 | 42 | 340 | 66 | 10 | 20 | 21 | 136 | 16 | 3.3 | 1.04 | − | − |
| 35 | 42 | 340 | 66 | 10 | 80 | 21 | 136 | 16 | 3.3 | 4.17 | − | − |
| 36 | 42 | 340 | 66 | 10 | 200 | 21 | 136 | 16 | 3.3 | 10.4 | − | − |

Abbreviations: KCl: potassium chloride; MSG: sodium L-glutamate; IN: disodium inosinate 7.5-hydrate; Glu: glutamic acid; IMP: inosinic acid (inosinic acid monophosphate); S: sulfur ingredient, which are the same with the following tables.

Experimental Example 2

Next, the effect of the identity of the sugar alcohol was examined. The evaluation was conducted using the cooked food of the bamboo shoot shown in Experiment Example 1. The organoleptic evaluation was also conducted in the same manner as in Experiment Example 1. The resulting evaluation results appear in Table 3 and show a slight difference in the strength of the acidic taste depending on the type of sugar alcohol used. However, it was identified that all sugar alcohols tested suppressed the acidic taste.

TABLE 3

| Run | Sugar alcohol | MSG | KCl | IN | S | Strength of acidic taste | Strength of acidic smell |
|---|---|---|---|---|---|---|---|
| 1 | Sorbitol 42 | 340 | 66 | 10 | 0.5 | − | + |
| 2 | Maltitol 42 | 340 | 66 | 10 | 0.5 | − | + |
| 3 | Mannitol 42 | 340 | 66 | 10 | 0.5 | − | + |
| 4 | Xylitol 42 | 340 | 66 | 10 | 0.5 | + | + |
| 5 | Paratinitol 42 | 340 | 66 | 10 | 0.5 | + | + |
| 6 | Lactitol 42 | 340 | 66 | 10 | 0.5 | + | + |
| 7 | TA-50* 84 | 340 | 66 | 10 | 0.5 | − | + |

(The value refers to an amount for addition, unit = mg)
*TA-50; made by Towa Chemical Industry Co., Ltd. (reduced hydrolyzed starch)

Experimental Example 3

The required conditions to provide foods having excellent preservation properties and having a favorable taste (including flavor) were studied by the following method. In the evaluation system, a cooked food of a bamboo shoot was used according to the recipes shown in Table 1 (see Experimental Example 1).

Specifically, sample A is a non-addition product and sample B is a product with the addition of a sodium acetate preparation. Salad Keep-80 (containing 40% of sodium acetate) made by Okuno Chemical Industries Co., Ltd. was used as a sodium acetate preparation. A water-boiled bamboo shoot was cut to a width of approximately 5 mm, and then pre-boiled in a boiling bath for 2 minutes. The raw ingredients of seasoning solutions A–B (Table 1) were mixed in a pot, and the mixtures were heated. After boiling, the water-boiled bamboo shoot was added to the seasoning solutions and heated under gentle boiling conditions for 10 minutes to obtain cooked (boiled) bamboo shoot samples. To the seasoning solution of sample B (Table 1), a sugar alcohol, sodium glutamate, potassium, and disodium inosinate were added at various concentrations to obtain a cooked (boiled) food. The resulting various cooked foods were organoleptically evaluated by 2 panelists. The results of this experiment appear in Table 4.

The strength of the acidic taste was evaluated according to 5 grades from − (having no acidic taste) to ++++ (having quite a strong acidic taste). As a baseline, the strength of an acidic taste of sample A was estimated as − (having no acidic taste), and a strength of an acidic taste of sample B as ++++ (having quite a strong acidic taste). As shown in Table 4, it was determined that the addition of a sugar alcohol (sorbitol), glutamic acid, potassium and disodium inosinate was indispensable for suppressing the acidic taste of the cooked food of the bamboo shoot (the boiled bamboo shoot). Further, the addition of a sulfur-containing amino acid or peptide further suppressed the acidic smell. Moreover, it was confirmed that the acidic taste could efficiently be suppressed by incorporating, in a weight ratio, 2 to 20 of sugar alcohol(s), 15 to 150 of glutamic acid, 2 to 20 of potassium and 0.2 to 10 of inosinic acid when a weight of disodium acetate was rated as 100.

TABLE 4

| | Amount (mg) | | | | Concentration based on all raw ingredients* | | | | Strength of |
|---|---|---|---|---|---|---|---|---|---|
| Run | sorbitol | MSG | KCl | IN | sorbitol | Glu | potassium | IMP | acidic taste |
| 1 | 0 | 0 | 0 | 0 | 0 | 0 | 0 | 0 | ++++ |
| 2 | 42 | 340 | 66 | 10 | 21 | 136 | 16 | 3.3 | − |
| 3 | 0 | 340 | 66 | 10 | 0 | 136 | 16 | 3.3 | +++ |
| 4 | 42 | 0 | 66 | 10 | 21 | 0 | 16 | 3.3 | +++ |

TABLE 4-continued

| | Amount (mg) | | | | Concentration based on all raw ingredients* | | | | Strength of |
|---|---|---|---|---|---|---|---|---|---|
| Run | sorbitol | MSG | KCl | IN | sorbitol | Glu | potassium | IMP | acidic taste |
| 5 | 42 | 340 | 0 | 10 | 21 | 136 | 0 | 3.3 | + |
| 6 | 42 | 340 | 66 | 0 | 21 | 136 | 16 | 0 | ++ |
| 7 | 11 | 85 | 17 | 2.5 | 5.5 | 34 | 4 | 0.8 | ++ |
| 8 | 21 | 170 | 33 | 5 | 10.5 | 68 | 8 | 1.7 | − |
| 9 | 33 | 255 | 44 | 7.5 | 16.5 | 102 | 12 | 2.5 | − |
| 10 | 63 | 510 | 99 | 15 | 21.5 | 204 | 24 | 5.0 | − |
| 11 | 84 | 680 | 132 | 20 | 42 | 272 | 32 | 6.6 | − |
| 12 | 11 | 340 | 66 | 10 | 5.5 | 136 | 16 | 3.3 | + |
| 13 | 21 | 340 | 66 | 10 | 10.5 | 136 | 16 | 3.3 | − |
| 14 | 84 | 340 | 66 | 10 | 42 | 136 | 16 | 3.3 | − |
| 15 | 126 | 340 | 66 | 10 | 63 | 136 | 16 | 3.3 | − |
| 16 | 168 | 340 | 66 | 10 | 84 | 136 | 16 | 3.3 | − |
| 17 | 42 | 85 | 66 | 10 | 21 | 34 | 16 | 3.3 | + |
| 18 | 42 | 170 | 66 | 10 | 21 | 68 | 16 | 3.3 | − |
| 19 | 42 | 680 | 66 | 10 | 21 | 272 | 16 | 3.3 | − |
| 20 | 42 | 1360 | 66 | 10 | 21 | 544 | 16 | 3.3 | − |
| 21 | 42 | 340 | 17 | 10 | 21 | 136 | 4 | 3.3 | ++ |
| 22 | 42 | 340 | 33 | 10 | 21 | 136 | 8 | 3.3 | − |
| 23 | 42 | 340 | 132 | 10 | 21 | 136 | 32 | 3.3 | − |
| 24 | 42 | 340 | 264 | 10 | 21 | 136 | 64 | 3.3 | − |
| 25 | 42 | 340 | 66 | 2.5 | 21 | 136 | 16 | 0.8 | + |
| 26 | 42 | 340 | 66 | 5 | 21 | 136 | 16 | 1.7 | − |
| 27 | 42 | 340 | 66 | 20 | 21 | 136 | 16 | 6.6 | − |
| 28 | 42 | 340 | 66 | 40 | 21 | 136 | 16 | 13.2 | − |
| 29 | 42 | 340 | 66 | 60 | 21 | 136 | 16 | 19.8 | − |
| 30 | 42 | 340 | 66 | 80 | 21 | 136 | 16 | 26.4 | − |

*(Unit is mg/100 g.)

Example 1

A cooked food of a bamboo shoot (i.e., a boiled bamboo shoot) was prepared using a commercial water-boiled bamboo shoot. Seasoning preparations and food recipes were as shown in Table 5.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

The water-boiled bamboo shoot was cut to a width of approximately 5 mm, and then pre-boiled in a boiling bath for 2 minutes. Raw ingredients of seasoning solutions A–C (Table 5) were mixed in a pot, and the mixtures were heated. After boiling, the water-boiled bamboo shoot was added to the mixtures in an amount stated in Table 5, and heated under gentle boiling conditions for 10 minutes to obtain a bamboo shoot cooked (boiled) food sample.

With respect to the resulting three types of the cooked foods, the organoleptic evaluation by 20 taste-panelists was performed using a 2-point comparison method in various combinations. Reference is given to "Sensory Evaluation of Food" by Harry T. Lawless and Hidegarde Heymann (Aspen Publishers, Inc., Gaithersburg, Md., pp. 116–139) for a detailed description of the two-sample comparison (choice) method employed herein. The results appear in Table 6 and show that the cooked food of the invention (sample C) provides significantly suppressed "acidic taste and acidic smell" compared to the product with the addition of sodium acetate (sample B) and the overall taste and flavor were also improved.

It was further shown that the cooked food of the invention (sample C) provided approximately the same evaluation in the overall preferable taste and flavor compared to the non-addition product (sample A).

As an additional test, samples B and C were stored at 15° C. for 48 hours, and the number of general microorganisms was counted. The resulting number of microorganisms was almost unchanged in both of the samples (<100/g).

TABLE 5

| Raw ingredients | | Sample A | Sample B | Sample C |
|---|---|---|---|---|
| water-boiled bamboo shoot | | 210 g | 210 g | 210 g |
| Seasoning solution | light-tasting soy sauce | 10 | 10 | 10 |
| | granulated sugar | 9 | 9 | 9 |
| | sake (rice wine) | 9 | 9 | 9 |
| | table salt | 1.5 | 1.5 | 1.5 |
| | "Honzukuri Ichiban Dashi" Katsuo* | 20 | 20 | 20 |
| | Salad Keep-80 | — | 5 | 5 |
| | sorbitol | — | — | 0.2 |
| | MSG | — | — | 0.6 |
| | potassium chloride | — | — | 0.1 |
| | disodium inosinate 7.5-hydrate | — | — | 0.04 |
| | YE-KM** | | | 0.2 |
| | water | 210 | 205 | 204.06 |

*Seasoning made by Ajinomoto Co., Inc.;
**Yeast extract containing 8% of glutathione, which are the same with the following tables.

TABLE 6

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |

TABLE 6-continued

| Evaluation item | Run 1 A:B | Run 2 B:C | Run 3 A:C |
|---|---|---|---|
| stronger acidic smell | 1:19* | 18:2* | 7:13 |
| overall preferable | 17:3* | 4:16* | 11:9 |

*There is a significant difference with a significance level of 5%.

Example 2

A cooked food of taros (sato-imo; i.e., boiled taros) was prepared using commercial frozen taros (water-boiled). Seasoning preparations and food recipes were as shown in Table 7.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

The frozen taros (sato-imo) were used after washing their surfaces with water. The raw ingredients of seasoning solutions A–C (Table 7) were mixed in a pot, and the mixtures were heated. After boiling, the frozen, washed taros were added to the seasoning compositions in an amount indicated in Table 7, and heated under gentle boiling conditions for 15 minutes to obtain a taro cooked (boiled) food sample.

With respect to the resulting three types of the cooked foods, the organoleptic evaluation by 20 taste-panelists was performed using a 2-point comparison method in various combinations. The results appear in Table 8 and show that the cooked food of the invention (sample C) provides significantly suppressed "acidic taste and acidic smell" compared to the product with the addition of sodium acetate (sample B) and the overall taste and flavor were also improved.

It was further shown that the cooked food of the invention (sample C) provided approximately the same evaluation in the overall preferable taste and flavor compared to the non-addition product (sample A).

TABLE 7

| Raw ingredients | | Sample A | Sample B | Sample C |
|---|---|---|---|---|
| frozen taros (after washed) | | 380 g | 380 g | 380 g |
| Seasoning solution | light-tasting soy sauce | 15 | 15 | 15 |
| | granulated sugar | 13 | 13 | 13 |
| | sake | 13 | 13 | 13 |
| | table salt | 2.2 | 2.2 | 2.2 |
| | "Honzukuri Ichiban Dashi" Katsuo | 30 | 30 | 30 |
| | Salad Keep-80 | — | 7 | 7 |
| | sorbitol | — | — | 0.3 |
| | MSG | — | — | 0.5 |
| | potassium chloride | — | — | 0.2 |
| | disodium inosinate 7.5-hydrate | — | — | 0.1 |
| | "Aromate BC" * | — | — | 5 |
| | water | 270 | 263 | 262.2 |

*Seasoning containing approximately 1.4% of cystine, which is the same with the following tables.

TABLE 8

| Evaluation item | Run 1 A:B | Run 2 B:C | Run 3 A:C |
|---|---|---|---|
| preferable flavor | 17:3* | 7:13 | 13:7 |
| preferable taste | 17:3* | 5:15 | 13:7 |
| stronger acidic taste | 1:19* | 16:4* | 8:12 |
| stronger acidic smell | 1:19* | 17:3* | 7:13 |
| overall preferable | 17:3* | 4:16* | 12:8 |

*There is a significant difference with a significance level of 5%.

Example 3

A cooked food of a butterbur (i.e., a boiled butterbur) was prepared using a commercial water-boiled butterbur (butterbur sprout). Seasoning preparations and food recipes were as shown in Table 9.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

The water-boiled butterbur was cut to a width of approximately 3 cm, and then pre-boiled in a boiling bath for 2 minutes. The raw ingredients of seasoning solutions A–C (Table 9) were mixed in a pot, and the mixtures were heated. After boiling, the water-boiled butterbur was added to the seasoning solutions, and heated under gentle boiling conditions for minutes to obtain a butterbur cooked (boiled) food sample.

With respect to the resulting three types of the cooked foods, the organoleptic evaluation by 20 taste-panelists was performed using a 2-point comparison method in various combinations. The results appear in Table 10 and show that the cooked food of the invention (sample C) provides significantly suppressed "acidic taste and acidic smell" compared to the product with the addition of sodium acetate (sample B) and the overall taste and flavor were also improved.

It was further shown that the cooked food of the invention (sample C) provided approximately the same evaluation in the overall preferable taste and flavor compared to the non-addition product (sample A).

TABLE 9

| Raw ingredients | | Sample A | Sample B | Sample C |
|---|---|---|---|---|
| water-boiled butterbur (after pre-boiled) | | 150 g | 150 g | 150 g |
| Seasoning solution | light-tasting soy sauce | 10 | 10 | 10 |
| | granulated sugar | 9 | 9 | 9 |
| | sake | 9 | 9 | 9 |
| | table salt | 1.5 | 1.5 | 1.5 |
| | "Honzukuri Ichiban Dashi" Katsuo | 20 | 20 | 20 |
| | Salad Keep-80 | — | 4 | 4 |
| | sorbitol | — | — | 0.3 |
| | MSG | — | — | 0.4 |
| | potassium chloride | — | — | 0.1 |
| | disodium inosinate 7.5-hydrate | — | — | 0.1 |
| | YE-KM | | | 0.1 |
| | water | 200 | 196 | 195.1 |

TABLE 10

| Evaluation item | Run 1 A:B | Run 2 B:C | Run 3 A:C |
|---|---|---|---|
| preferable flavor | 18:2* | 6:14 | 12:8 |
| preferable taste | 19:1* | 5:15 | 11:9 |
| stronger acidic taste | 1:19* | 18:2* | 9:11 |
| stronger acidic smell | 1:19* | 16:4* | 8:12 |
| overall preferable | 19:1* | 2:18* | 8:12 |

*There is a significant difference with a significance level of 5%.

Example 4

A boiled lotus root (i.e., a cooked food of a lotus root) was prepared using a commercial lotus root. Seasoning preparations and food recipes were as shown in Table 11.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

The lotus root was peeled, cut to a thickness of approximately 5 mm, dipped in a vinegar solution (20-fold dilute solution of a grain vinegar) for 10 minutes, and then washed with running water. Raw ingredients of seasoning solutions A–C (Table 11) were mixed in a pot, and the mixtures were heated. After boiling, the lotus root was added to the seasoning solutions, and heated under gentle boiling conditions for 10 minutes to obtain a lotus root cooked (boiled) food sample.

With respect to the resulting three types of the cooked foods, the organoleptic evaluation by 20 taste-panelists was performed using a 2-point comparison method in various combinations. The results appear in Table 12 and show that the cooked food of the invention (sample C) provides significantly suppressed "acidic taste and acidic smell" compared to the product with the addition of sodium acetate (sample B) and the overall taste and flavor were also improved.

It was further shown that the cooked food of the invention (sample C) provided approximately the same evaluation in the overall preferable taste and flavor compared to the non-addition product (sample A).

TABLE 11

| Raw ingredients | | Sample A | Sample B | Sample C |
|---|---|---|---|---|
| lotus root (after dipped in vinegar solution) | | 200 g | 200 g | 200 g |
| Seasoning solution | light-tasting soy sauce | 17 | 17 | 17 |
| | granulated sugar | 15 | 15 | 15 |
| | sake | 15 | 15 | 15 |
| | table salt | 2.6 | 2.6 | 2.6 |
| | "Honzukuri Ichiban Dashi" Katsuo | 35 | 35 | 35 |
| | Salad Keep-80 | — | 6 | 6 |
| | sorbitol | — | — | 0.3 |
| | MSG | — | — | 0.7 |
| | potassium chloride | — | — | 0.1 |
| | disodium inosinate 7.5-hydrate | — | — | 0.1 |
| | YE-KM | — | — | 0.2 |
| | water | 320 | 314 | 313 |

TABLE 12

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |
| stronger acidic smell | 1:19* | 17:3* | 8:12 |
| overall preferable | 18:2* | 3:17* | 10:10 |

*There is a significant difference with a significance level of 5%.

Example 5

Nikujaga (i.e., boiled meat & potato) was prepared by the following process. Seasoning preparations and food recipes were as shown in Table 13.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

An onion and pork were fried in salad oil, and further fried with the addition of potatoes. Seasoning solutions A–C (Table 13) were added, and the blends were cooked over moderate heat for 20 minutes to obtain nikujaga samples.

With respect to the resulting samples, the organoleptic evaluation by 20 taste-panelists was performed using a 2-point comparison method in various combinations. The results appear in Table 14 and show that the nikujaga of the invention (sample C) provides significantly suppressed "acidic taste and acidic smell" compared to the product with the addition of sodium acetate (sample B) and the overall taste and flavor were also improved.

It was further shown that the nikujaga of the invention (sample C) provided approximately the same evaluation in the overall preferable taste and flavor compared to the non-addition product (sample A).

As an additional test, samples B and C were stored at 15° C. for 48 hours, and the number of general microorganisms was counted. The resulting number of microorganisms was almost unchanged in both of the samples (<100/g).

TABLE 13

| Raw ingredients | | Sample A | Sample B | Sample C |
|---|---|---|---|---|
| potatoes | | 300 g | 300 g | 300 g |
| onion | | 200 | 200 | 200 |
| pork belly (fine slices) | | 200 | 200 | 200 |
| salad oil | | 28 | 28 | 28 |
| Seasoning solution | strong-tasting soy sauce | 86 | 86 | 86 |
| | granulated sugar | 58 | 58 | 58 |
| | sake | 42 | 42 | 42 |
| | sweet sake | 34 | 34 | 34 |
| | "Honzukuri Ichiban Dashi" Katsuo | 50 | 50 | 50 |
| | Salad Keep-80 | — | 15 | 15 |
| | sorbitol | — | — | 0.5 |
| | MSG | — | — | 1.5 |
| | potassium chloride | — | — | 0.3 |
| | disodium inosinate 7.5-hydrate | — | — | 0.2 |
| | YE-KM | — | — | 0.5 |
| | water | 450 | 435 | 433 |

TABLE 14

| Evaluation item | Run 1 A:B | Run 2 B:C | Run 3 A:C |
|---|---|---|---|
| preferable flavor | 14:6 | 7:13 | 12:8 |
| preferable taste | 14:6 | 7:13 | 11:9 |
| stronger acidic taste | 5:15 | 14:6 | 9:11 |
| stronger acidic smell | 1:19* | 17:3* | 7:13 |
| overall preferable | 13:7 | 5:15 | 11:9 |

*There is a significant difference with a significance level of 5%.

Example 6

Various types of chikuzen-ni (i.e., boiled Japanese vegetables & chicken) were prepared by the following process. Seasoning preparations and food recipes were as shown in Table 15.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

Chicken was fried in salad oil, and further fried with the addition of vegetables, mushrooms and konnyaku (konjak). Seasoning solutions A–C (Table 15) were added thereto, and the blends were cooked over moderate heat for 15 minutes to obtain chikuzen-ni samples.

With respect to the resulting samples, the organoleptic evaluation by 20 taste-panelists was performed using a 2-point comparison method in various combinations. The results appear in Table 16 and show that the chikuzen-ni of the invention (sample C) provides significantly suppressed "acidic taste and acidic smell" compared to the product with the addition of sodium acetate (sample B) and the overall taste and flavor were also improved.

It was further shown that the chikuzen-ni of the invention (sample C) provided approximately the same evaluation in the overall preferable taste and flavor compared to the non-addition product (sample A).

As an additional test, samples B and C were stored at 15° C. for 48 hours, and the number of general microorganisms was counted. The resulting number of microorganisms was almost unchanged in both of the samples (<100/g).

TABLE 15

| Raw ingredients | | Sample A | Sample B | Sample C |
|---|---|---|---|---|
| taros | | 130 g | 130 g | 130 g |
| bamboo shoot | | 60 | 60 | 60 |
| lotus root | | 50 | 50 | 50 |
| carrot | | 50 | 50 | 50 |
| mushrooms | | 50 | 50 | 50 |
| burdock root | | 25 | 25 | 25 |
| chicken (breast) | | 200 | 200 | 200 |
| konnyaku (konjak) | | 150 | 150 | 150 |
| Seasoning solution | strong-tasting soy sauce | 50 | 50 | 50 |
| | granulated sugar | 43 | 43 | 43 |
| | sake | 28 | 28 | 28 |
| | sweet sake | 34 | 34 | 34 |
| | "Honzukuri Ichiban Dashi" Katsuo | 50 | 50 | 50 |
| | Salad Keep-80 | — | 15 | 15 |

TABLE 15-continued

| Raw ingredients | Sample A | Sample B | Sample C |
|---|---|---|---|
| sorbitol | — | — | 0.5 |
| MSG | — | — | 1.6 |
| potassium chloride | — | — | 0.3 |
| disodium inosinate 7.5-hydrate | — | — | 0.2 |
| YE-KM | — | — | 0.5 |
| water | 450 | 435 | 433 |

TABLE 16

| Evaluation item | Run 1 A:B | Run 2 B:C | Run 3 A:C |
|---|---|---|---|
| preferable flavor | 14:6 | 7:13 | 10:10 |
| preferable taste | 14:6 | 7:13 | 9:11 |
| stronger acidic taste | 5:15 | 14:6 | 9:11 |
| stronger acidic smell | 4:16* | 14:6 | 8:12 |
| overall preferable | 13:7 | 6:14 | 9:11 |

*There is a significant difference with a significance level of 5%.

Example 7

Various types of hamburger (i.e., hamburg; hamburg steak) were prepared by the following process. Seasoning preparations and food recipes were as shown in Table 17.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

In a usual manner, raw ingredients were mixed, and both surfaces thereof were then fried in salad oil to obtain hamburger samples.

With respect to the resulting samples, the organoleptic evaluation by 20 taste-panelists was performed using a 2-point comparison method in various combinations. The results appear in Table 18 and show that the hamburger of the invention (sample C) provides significantly suppressed "acidic taste and acidic smell" compared to the product with the addition of sodium acetate (sample B) and the overall taste and flavor were also improved.

It was further shown that the hamburger of the invention (sample C) provided approximately the same evaluation in the overall preferable taste and flavor compared to the non-addition product (sample A).

TABLE 17

| Raw ingredients | Sample A | Sample B | Sample C |
|---|---|---|---|
| ground beef | 400 g | 400 g | 400 g |
| ground pork | 400 | 400 | 400 |
| onion | 500 | 500 | 500 |
| whipped egg | 100 | 100 | 100 |
| bread crumb | 44 | 44 | 44 |
| milk | 90 | 90 | 90 |
| table salt | 11 | 11 | 11 |
| pepper | 0.4 | 0.4 | 0.4 |
| Salad Keep-80 | — | 15.5 | 15.5 |
| sorbitol | — | — | 1 |

TABLE 17-continued

| Raw ingredients | Sample A | Sample B | Sample C |
|---|---|---|---|
| MSG | — | — | 3 |
| potassium chloride | — | — | 0.3 |
| disodium inosinate 7.5-hydrate | — | — | 0.2 |
| YE-KM | — | — | 0.4 |

TABLE 18

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |
| stronger acidic smell | 1:19* | 17:3* | 8:12 |
| overall preferable | 17:3* | 4:16* | 11:9 |

*There is a significant difference with a significance level of 5%.

Example 8

Various types of gyoza were prepared by the following process. Seasoning preparations and food recipes were as shown in Table 19.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

In a usual manner, raw ingredients were blended, and the blend was packed in dough, and fried in salad oil to obtain gyoza samples.

With respect to the resulting samples, the organoleptic evaluation by 20 taste-panelists was performed using a 2-point comparison method in various combinations. The results appear in Table 20 and show that the gyoza of the invention (sample C) provides significantly suppressed "acidic taste and acidic smell" compared to the product with the addition of sodium acetate (sample B) and the overall taste and flavor were also improved.

It was further shown that the gyoza of the invention (sample C) provided approximately the same evaluation in the overall preferable taste and flavor compared to the non-addition product (sample A).

TABLE 19

| Raw ingredients | Sample A | Sample B | Sample C |
|---|---|---|---|
| ground pork | 250 g | 250 g | 250 g |
| welsh onion | 100 | 100 | 100 |
| chinese cabbage | 400 | 400 | 400 |
| ginger | 15 | 15 | 15 |
| leek | 30 | 30 | 30 |
| garlic | 10 | 10 | 10 |
| strong-tasting soy sauce | 34 | 34 | 34 |
| sesame oil | 21 | 21 | 21 |
| sake | 14 | 14 | 14 |
| table salt | 3 | 3 | 3 |
| pepper | 0.4 | 0.4 | 0.4 |
| Salad Keep-80 | — | 9 | 9 |
| sorbitol | — | — | 0.8 |

TABLE 19-continued

| Raw ingredients | Sample A | Sample B | Sample C |
|---|---|---|---|
| MSG | — | — | 1 |
| potassium chloride | — | — | 0.3 |
| disodium inosinate 7.5-hydrate | — | — | 0.1 |
| YE-KM | — | — | 0.3 |

TABLE 20

| Evaluation item | Run 1 A:B | Run 2 B:C | Run 3 A:C |
|---|---|---|---|
| preferable flavor | 14:6 | 7:13 | 10:10 |
| preferable taste | 14:6 | 7:13 | 12:8 |
| stronger acidic taste | 5:15 | 14:6 | 12:8 |
| stronger acidic smell | 4:16* | 15:5 | 8:12 |
| overall preferable | 13:7 | 6:14 | 12:8 |

*There is a significant difference with a significance level of 5%.

Example 9

Various types of cooked (boiled) rice were prepared by the following process. Seasoning preparations and food recipes were as shown in Table 21.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

In a usual manner, raw ingredients were blended, and the blend was cooked under ordinary rice-cooking conditions to obtain cooked (boiled) rice samples.

With respect to the resulting samples, the organoleptic evaluation by 20 taste-panelists was performed using a 2-point comparison method in various combinations. The results appear in Table 22 and show that the cooked rice of the invention (sample C) provides significantly suppressed "acidic taste and acidic smell" compared to the product with the addition of sodium acetate (sample B) and the overall taste and flavor were also improved.

It was further shown that the cooked rice of the invention (sample C) provided approximately the same evaluation in the overall preferable taste and flavor compared to the non-addition product (sample A).

TABLE 21

| Raw ingredients | Sample A | Sample B | Sample C |
|---|---|---|---|
| rice | 6 cups | 6 cups | 6 cups |
| chicken | 140 g | 140 g | 140 g |
| carrot | 100 | 100 | 100 |
| konnyaku (alimentary yam paste; konjak) | 100 | 100 | 100 |
| fried bean curd | 50 | 50 | 50 |
| burdock root | 100 | 100 | 100 |
| dry mushrooms | 30 | 30 | 30 |
| "Honzukuri Ichiban Dashi" Katsuo | 100 | 100 | 100 |
| sake | 50 | 50 | 50 |
| strong-tasting soy sauce | 18 | 18 | 18 |
| table salt | 4 | 4 | 4 |

TABLE 21-continued

| Raw ingredients | Sample A | Sample B | Sample C |
|---|---|---|---|
| Salad Keep-80 | — | 30 | 30 |
| sorbitol | — | — | 1.5 |
| MSG | — | — | 3.0 |
| potassium chloride | — | — | 1 |
| disodium inosinate 7.5-hydrate | — | — | 0.3 |
| "Aromate BC" | — | — | 1.6 |
| water | 1300 | 1270 | 1266 |

TABLE 22

| Evaluation item | Run 1 A:B | Run 2 B:C | Run 3 A:C |
|---|---|---|---|
| preferable flavor | 14:6 | 7:13 | 10:10 |
| preferable taste | 14:6 | 7:13 | 12:8 |
| stronger acidic taste | 5:15 | 14:6 | 12:8 |
| stronger acidic smell | 1:19* | 18:2* | 8:12 |
| overall preferable | 13:7 | 6:14 | 12:8 |

*There is a significant difference with a significance level of 5%.

Example 10

Various types of cream stew were prepared by the following process using a commercial cream stew roux (made by House Foods Corporation). Seasoning preparations and food recipes were as shown in Table 23.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

An onion, chicken and a carrot were fried in salad oil, and further fried with the addition of potatoes. Water (or sodium acetate) was added thereto, and the blend was cooked over moderate heat for 20 minutes. The commercial cream stew roux was added thereto, and the blend was further heated over low heat for 10 minutes to obtain cream stew samples.

With respect to the resulting samples, the organoleptic evaluation by 20 taste-panelists was performed using a 2-point comparison method in various combinations. The results appear in Table 24 and show that the cream stew of the invention (sample C) provides significantly suppressed "acidic taste and acidic smell" compared to the product with the addition of sodium acetate (sample B) and the overall taste and flavor were also improved.

It was further shown that the cream stew of the invention (sample C) provided approximately the same evaluation in the overall preferable taste and flavor compared to the non-addition product (sample A).

As an additional test, samples B and C were stored at 15° C. for 48 hours, and the number of general microorganisms was counted. The resulting number of microorganisms was almost unchanged in both of the samples (<100/g).

TABLE 23

| Raw ingredients | | Sample A | Sample B | Sample C |
|---|---|---|---|---|
| potatoes | | 600 g | 600 g | 600 g |
| onion | | 800 | 800 | 800 |
| carrot | | 200 | 200 | 200 |
| chicken (breast) | | 500 | 500 | 500 |
| salad oil | | 42 | 42 | 42 |
| Seasoning solution | stew roux (made by House Foods Corporation) | 228 | 228 | 228 |
| | Salad Keep-80 | — | 45 | 45 |
| | sorbitol | — | — | 2 |
| | MSG | — | — | 6 |
| | potassium chloride | — | — | 1 |
| | disodium inosinate 7.5-hydrate | — | — | 0.5 |
| | "Aromate BC" | — | — | 2.5 |
| | water | 2000 | 1955 | 1949 |

TABLE 24

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |
| stronger acidic smell | 1:19* | 17:3* | 8:12 |
| overall preferable | 17:3* | 4:16* | 11:9 |

*There is a significant difference with a significance level of 5%.

Example 11

Various types of curry were prepared by the following process using a commercial curry roux (made by House Foods Corporation). Seasoning preparations and food recipes were as shown in Table 25.

Specifically, sample A is a non-addition product, sample B is a product with the addition of a sodium acetate preparation, and sample C is the inventive product containing sodium acetate, a sugar alcohol, glutamic acid, potassium, inosinic acid and a sulfur-containing compound. Salad Keep-80 (containing 40% of sodium acetate) made by Okuno Chemical Industries Co., Ltd. was used as a sodium acetate preparation.

An onion, pork meat and a carrot were fried in salad oil, and further fried with the addition of potatoes. Water (or sodium acetate) was added thereto, and the blend was cooked over moderate heat for 20 minutes. The commercial curry roux was added thereto, and the blend was further heated over low heat for 10 minutes to obtain curry samples.

With respect to the resulting samples, the organoleptic evaluation by 20 taste-panelists was performed using a 2-point comparison method in various combinations. The results appear in Table 26 and show that the curry of the invention (sample C) provides significantly suppressed "acidic taste and acidic smell" compared to the product with the addition of sodium acetate (sample B) and the overall taste and flavor were also improved.

It was further shown that the curry of the invention (sample C) provided approximately the same evaluation in the overall preferable taste and flavor compared to the non-addition product (sample A).

TABLE 25

| Raw ingredients | | Sample A | Sample B | Sample C |
|---|---|---|---|---|
| potatoes | | 300 g | 300 g | 300 g |
| onion | | 600 | 600 | 600 |
| carrot | | 200 | 200 | 200 |
| pork | | 400 | 400 | 400 |
| salad oil | | 28 | 28 | 28 |
| Seasoning solution | curry roux (made by House Foods Corporation) | 200 | 200 | 200 |
| | Salad Keep-80 | — | 30 | 30 |
| | sorbitol | — | — | 1 |
| | MSG | — | — | 4 |
| | potassium chloride | — | — | 0.7 |
| | disodium inosinate 7.5-hydrate | — | — | 0.3 |
| | YE-KM | — | — | 0.7 |
| | water | 1100 | 1070 | 1066 |

TABLE 26

| Evaluation item | Run 1 A:B | Run 2 B:C | Run 3 A:C |
|---|---|---|---|
| preferable flavor | 14:6 | 7:13 | 11:9 |
| preferable taste | 14:6 | 7:13 | 12:8 |
| stronger acidic taste | 5:15 | 14:6 | 12:8 |
| stronger acidic smell | 3:17* | 17:3* | 8:12 |
| overall preferable | 13:7 | 6:14 | 11:9 |

*There is a significant difference with a significance level of 5%.

Example 12

Various types of cooked (fried) vegetables were prepared by the following process. Vegetables shown in Recipe Table 27 were fried in salad oil, and seasoning solutions A–C were added thereto to obtain samples of cooked vegetables.

With respect to the resulting samples, the organoleptic evaluation by 20 taste-panelists was performed using a 2-point comparison method in various combinations. The results appear in Table 28 and show that the product of the invention (sample C) provides significantly suppressed "acidic taste and acidic smell" compared to the product with the addition of sodium acetate (sample B) and the overall taste and flavor were also improved.

It was further shown that the product of the invention (sample C) provided approximately the same evaluation in the overall preferable taste and flavor compared to the non-addition product (sample A).

TABLE 27

| Raw ingredients | Sample A | Sample B | Sample C |
|---|---|---|---|
| pork belly (fine slices) | 360 g | 360 g | 360 g |
| cabbage | 600 | 600 | 600 |
| onion | 360 | 360 | 360 |
| soybean sprouts | 300 | 300 | 300 |
| green pepper | 180 | 180 | 180 |
| table salt | 15 | 15 | 15 |
| pepper | 1.2 | 1.2 | 1.2 |
| Salad Keep-80 | — | 15 | 15 |
| sorbitol | — | — | 0.8 |
| MSG | — | — | 5 |
| potassium chloride | — | — | 0.3 |
| disodium inosinate 7.5-hydrate | — | — | 0.1 |
| "Aromate BC" | — | — | 5 |

TABLE 28

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |
| stronger acidic smell | 1:19* | 17:3* | 8:12 |
| overall preferable | 17:3* | 4:16* | 11:9 |

*There is a significant difference with a significance level of 5%.

Example 13

Various types of thick cooked roll egg were prepared by the following process. Raw ingredients shown in Recipe Table 29 were mixed, and then fried to obtain samples of a thick cooked roll egg.

With respect to the resulting samples, the organoleptic evaluation by 20 taste-panelists was performed using a 2-point comparison method in various combinations. The results appear in Table 30 and show that the product of the invention (sample C) provides significantly suppressed "acidic taste and acidic smell" compared to the product with the addition of sodium acetate (sample B) and the overall taste and flavor were also improved.

It was further shown that the product of the invention (sample C) provided approximately the same evaluation in the overall preferable taste and flavor compared to the non-addition product (sample A).

TABLE 29

| Raw ingredients | Sample A | Sample B | Sample C |
|---|---|---|---|
| egg (whole egg) | 200 g | 200 g | 200 g |
| water | 40 | 40 | 40 |
| "Honzukuri Ichiban Dashi" Katsuo | 10 | 10 | 10 |
| table salt | 1.3 | 1.3 | 1.3 |
| light-tasting soy sauce | 6 | 6 | 6 |
| sweet sake | 6 | 6 | 6 |
| Salad Keep-80 | — | 2.5 | 2.5 |
| sorbitol | — | — | 0.3 |
| MSG | — | — | 0.5 |
| potassium chloride | — | — | 0.1 |
| disodium inosinate 7.5-hydrate | — | — | 0.05 |
| YE-KM | — | — | 0.07 |

TABLE 30

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 2:18* | 17:3* | 7:13 |
| stronger acidic smell | 1:19* | 17:3* | 8:12 |
| overall preferable | 17:3* | 4:16* | 13:7 |

*There is a significant difference with a significance level of 5%.

Example 14

LL (long life) noodles were prepared by the following process. Raw ingredients of outer dough and middle dough shown in Recipe Table 31 were mixed, and the mixture was rolled such that the outer dough reached approximately 0.7 mm and the middle dough reached approximately 2.1 mm. The resulting samples were cut, boiled for approximately 8 minutes, dipped in various acid solutions for 5 minutes, packed, and then steamed for 1 hour.

With respect to the resulting samples, the organoleptic evaluation by 20 taste-panelists was performed using a 2-point comparison method in various combinations. The results appear in Table 32 and show that the product of the invention (sample C) provides significantly suppressed "acidic taste and acidic smell" compared to the product with the addition of lactic acid (sample B) and the overall taste and flavor were also improved.

It was further shown that the product of the invention (sample C) provided approximately the same evaluation in the overall preferable taste and flavor compared to the non-addition product (sample A).

TABLE 31

| Raw ingredients | Sample A | Sample B | Sample C |
|---|---|---|---|
| Outer dough | | | |
| wheat flour | 70 g | 70 g | 70 g |
| table salt | 3 | 3 | 3 |
| starch | 30 | 30 | 30 |
| water | 38 | 38 | 38 |
| Middle dough | | | |
| wheat flour | 100 | 100 | 100 |
| table salt | 3 | 3 | 3 |
| water | 38 | 38 | 38 |
| milk protein | 3 | 3 | 3 |
| Dipping solution | | | |
| lactic acid | — | 6.5 | 6.5 |
| water | 900 | 900 | 900 |
| sorbitol | — | — | 0.3 |
| MSG | — | — | 0.3 |
| potassium chloride | — | — | 0.1 |
| disodium inosinate 7.5-hydrate | — | — | 0.02 |
| "Aromate BC" | — | — | 0.2 |

TABLE 32

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 2:18* | 17:3* | 7:13 |
| stronger acidic smell | 6:14 | 14:6 | 8:12 |
| overall preferable | 17:3* | 4:16* | 13:7 |

*There is a significant difference with a significance level of 5%.

Example 15

A cooked (boiled) food of a bamboo shoot was prepared using a commercial water-boiled bamboo shoot. Seasoning preparations and food recipes were as shown in Table 33.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

The water-boiled bamboo shoot was cut to a width of approximately 5 mm, and then pre-boiled in a boiling bath for 2 minutes. Raw ingredients of seasoning solutions A–C (Table 33) were mixed in a pot, and the mixtures were heated. After boiling, the water-boiled bamboo shoot was added to seasoning solutions A–C, and heated under gentle boiling conditions for 10 minutes to obtain bamboo shoot cooked (boiled) food samples.

With respect to the resulting three types of the cooked foods, the organoleptic evaluation by 20 taste-panelists was performed using a 2-point comparison method in various combinations. The results appear in Table 34 and show that the cooked food of the invention (sample C) provides significantly suppressed "acidic taste" compared to the product with the addition of sodium acetate (sample B) and the overall taste and flavor were also improved.

It was further shown that the cooked food of the invention (sample C) provided approximately the same evaluation in the overall preferable taste and flavor compared to the non-addition product (sample A).

As an additional test, samples B and C were stored at 15° C. for 48 hours, and the number of general microorganisms was counted. The resulting number of microorganisms was almost unchanged in both of the samples (<100/g).

TABLE 33

| Raw ingredients | | Sample A | Sample B | Sample C |
|---|---|---|---|---|
| water-boiled bamboo shoot | | 210 g | 210 g | 210 g |
| Seasoning solution | light-tasting soy sauce | 10 | 10 | 10 |
| | granulated sugar | 9 | 9 | 9 |
| | sake | 9 | 9 | 9 |
| | table salt | 1.5 | 1.5 | 1.5 |
| | "Honzukuri Ichiban Dashi" Katsuo | 20 | 20 | 20 |
| | Salad Keep-80 | — | 5 | 5 |
| | sorbitol | — | — | 0.2 |
| | MSG | — | — | 0.4 |
| | potassium chloride | — | — | 0.1 |
| | disodium inosinate 7.5-hydrate | — | — | 0.04 |
| | water | 210 | 205 | 204.26 |

TABLE 34

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |
| overall preferable | 17:3* | 4:16* | 11:9 |

*There is a significant difference with a significance level of 5%.

Example 16

A cooked food of taros (sato-imo; i.e., a boiled taros) was prepared using commercial frozen taros (water-boiled). Seasoning preparations and food recipes were as shown in Table 35.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

The frozen taros were used after washing their surfaces with water. Raw ingredients of seasoning solutions A–C (Table 35) were mixed in a pot, and the mixtures were heated. After boiling, the frozen taros being washed were added to the seasoning solutions, and heated under gentle boiling conditions for 15 minutes to obtain taro cooked (boiled) food samples.

With respect to the resulting three types of the cooked foods, the organoleptic evaluation by 20 taste-panelists was performed using a 2-point comparison method in various combinations. The results appear in Table 36 and show that the cooked food of the invention (sample C) provides significantly suppressed "acidic taste and acidic smell" compared to the product with the addition of sodium acetate (sample B) and the overall taste and flavor were also improved.

It was further shown that the cooked food of the invention (sample C) provided approximately the same evaluation in the overall preferable taste and flavor compared to the non-addition product (sample A).

TABLE 35

| Raw ingredients | | Sample A | Sample B | Sample C |
|---|---|---|---|---|
| frozen taros (after washed) | | 380 g | 380 g | 380 g |
| Seasoning solution | light-tasting soy sauce | 15 | 15 | 15 |
| | granulated sugar | 13 | 13 | 13 |
| | sake | 13 | 13 | 13 |
| | table salt | 2.2 | 2.2 | 2.2 |
| | "Honzukuri Ichiban Dashi" Katsuo | 30 | 30 | 30 |
| | Salad Keep-80 | — | 7 | 7 |
| | sorbitol | — | — | 0.3 |
| | MSG | — | — | 0.5 |
| | potassium chloride | — | — | 0.2 |
| | disodium inosinate 7.5-hydrate | — | — | 0.1 |
| | water | 270 | 263 | 262.2 |

*Seasoning containing approximately 1.4% of cystine, which is the same with the following tables.

TABLE 36

| Evaluation item | Run 1 A:B | Run 2 B:C | Run 3 A:C |
|---|---|---|---|
| preferable flavor | 17:3* | 7:13 | 13:7 |
| preferable taste | 17:3* | 5:15 | 13:7 |
| stronger acidic taste | 1:19* | 16:4* | 8:12 |
| overall preferable | 17:3* | 4:16* | 12:8 |

*There is a significant difference with a significance level of 5%.

Example 17

A cooked food of a butterbur (i.e., a boiled butterbur) was prepared using a commercial water-boiled butterbur. Seasoning preparations and food recipes were as shown in Table 37.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

The water-boiled butterbur was cut to a width of approximately 3 cm, and then pre-boiled in a boiling bath for 2 minutes. Raw ingredients of seasoning solutions A–C (Table 37) were mixed in a pot, and the mixtures were heated. After boiling, the water-boiled butterbur was added to the seasoning solutions, and heated under gentle boiling conditions for 5 minutes to obtain butterbur cooked (boiled) food samples.

With respect to the resulting three types of the cooked foods, the organoleptic evaluation by 20 taste-panelists was performed using a 2-point comparison method in various combinations. The results appear in Table 38 and show that the cooked food of the invention (sample C) provides significantly suppressed "acidic taste" compared to the product with the addition of sodium acetate (sample B) and the overall taste and flavor were also improved.

It was further shown that the cooked food of the invention (sample C) provided approximately the same evaluation in the overall preferable taste and flavor compared to the non-addition product (sample A).

TABLE 37

| Raw ingredients | | Sample A | Sample B | Sample C |
|---|---|---|---|---|
| water-boiled butterbur (after being pre-boiled) | | 150 g | 150 g | 150 g |
| Seasoning solution | light-tasting soy sauce | 10 | 10 | 10 |
| | granulated sugar | 9 | 9 | 9 |
| | sake | 9 | 9 | 9 |
| | table salt | 1.5 | 1.5 | 1.5 |
| | "Honzukuri Ichiban Dashi" Katsuo | 20 | 20 | 20 |
| | Salad Keep-80 | — | 4 | 4 |
| | sorbitol | — | — | 0.3 |
| | MSG | — | — | 0.4 |
| | potassium chloride | — | — | 0.1 |
| | disodium inosinate 7.5-hydrate | — | — | 0.1 |
| | water | 200 | 196 | 195.1 |

TABLE 38

| Evaluation item | Run 1 A:B | Run 2 B:C | Run 3 A:C |
|---|---|---|---|
| preferable flavor | 18:2* | 6:14 | 12:8 |
| preferable taste | 19:1* | 5:15 | 11:9 |
| stronger acidic taste | 1:19* | 18:2* | 9:11 |
| overall preferable | 19:1* | 2:18* | 8:12 |

*There is a significant difference with a significance level of 5%.

Example 18

A boiled lotus root (i.e., a cooked food of lotus root) was prepared using a commercial lotus root. Seasoning preparations and food recipes were as shown in Table 39.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

The lotus root was peeled, cut to a thickness of approximately 5 mm, and dipped in a vinegar solution (20-fold dilute solution of a grain vinegar) for 10 minutes, and then washed with running water. Raw ingredients of seasoning solutions A–C (Table 39) were mixed in a pot, and the mixtures were heated. After boiling, the lotus root was added thereto, and heated under gentle boiling conditions for 10 minutes to obtain lotus root cooked (boiled) food samples.

With respect to the resulting three types of the cooked foods, the organoleptic evaluation by 20 taste-panelists was performed using a 2-point comparison method in various combinations. The results appear in Table 40 and show that the cooked food of the invention (sample C) provides significantly suppressed "acidic taste" compared to the product with the addition of sodium acetate (sample B) and the overall taste and flavor were also improved.

It was further shown that the cooked food of the invention (sample C) provided approximately the same evaluation in the overall preferable taste and flavor compared to the non-addition product (sample A).

TABLE 39

| Raw ingredients | | Sample A | Sample B | Sample C |
|---|---|---|---|---|
| lotus root (after dipped in vinegar solution) | | 200 g | 200 g | 200 g |
| Seasoning solution | light-tasting soy sauce | 17 | 17 | 17 |
| | granulated sugar | 15 | 15 | 15 |
| | sake | 15 | 15 | 15 |
| | table salt | 2.6 | 2.6 | 2.6 |
| | "Honzukuri Ichiban Dashi" Katsuo | 35 | 35 | 35 |
| | Salad Keep-80 | — | 6 | 6 |
| | sorbitol | — | — | 0.3 |
| | MSG | — | — | 0.5 |
| | potassium chloride | — | — | 0.1 |
| | disodium inosinate 7.5-hydrate | — | — | 0.1 |
| | water | 320 | 314 | 313 |

TABLE 40

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |
| overall preferable | 18:2* | 3:17* | 10:10 |

*There is a significant difference with a significance level of 5%.

Example 19

Nikujaga (i.e., boiled meat & potato) was prepared by the following process. Seasoning preparations and food recipes were as shown in Table 41.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

An onion and pork were fried in salad oil, and further fried with the addition of potatoes. Seasoning solutions A–C (Table 41) were added thereto, and the blends were cooked over moderate heat for 20 minutes to obtain nikujaga samples.

With respect to the resulting samples, the organoleptic evaluation by 20 taste-panelists was performed using a 2-point comparison method in various combinations. The results appear in Table 42 and show that the nikujaga of the invention (sample C) provides significantly suppressed "acidic taste" compared to the product with the addition of sodium acetate (sample B) and the overall taste and flavor were also improved.

It was further shown that the nikujaga of the invention (sample C) provided approximately the same evaluation in the overall preferable taste and flavor compared to the non-addition product (sample A).

As an additional test, samples B and C were stored at 15° C. for 48 hours, and the number of general microorganisms was counted. The resulting number of microorganisms was almost unchanged in both of the samples (<100/g).

TABLE 41

| Raw ingredients | | Sample A | Sample B | Sample C |
|---|---|---|---|---|
| potatoes | | 300 g | 300 g | 300 g |
| onion | | 200 | 200 | 200 |
| pork belly (fine slices) | | 200 | 200 | 200 |
| salad oil | | 28 | 28 | 28 |
| Seasoning solution | strong-tasting soy sauce | 86 | 86 | 86 |
| | granulated sugar | 58 | 58 | 58 |
| | sake | 42 | 42 | 42 |
| | sweet sake | 34 | 34 | 34 |
| | "Honzukuri Ichiban Dashi" Katsuo | 50 | 50 | 50 |
| | Salad Keep-80 | — | 15 | 15 |
| | sorbitol | — | — | 0.5 |
| | MSG | — | — | 1 |
| | potassium chloride | — | — | 0.3 |
| | disodium inosinate 7.5-hydrate | — | — | 0.2 |
| | water | 450 | 435 | 433 |

TABLE 42

| Evaluation item | Run 1 A:B | Run 2 B:C | Run 3 A:C |
|---|---|---|---|
| preferable flavor | 14:6 | 7:13 | 12:8 |
| preferable taste | 14:6 | 7:13 | 11:9 |
| stronger acidic taste | 5:15 | 14:6 | 9:11 |
| overall preferable | 13:7 | 5:15 | 11:9 |

*There is a significant difference with a significance level of 5%.

Example 20

Various types of chikuzen-ni (boiled Japanese vegetables & chicken) were prepared by the following process. Seasoning preparations and food recipes were as shown in Table 43.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

Chicken was fried in salad oil, and further fried with the addition of vegetables, mushrooms and konnyaku (konjak). Seasoning solutions A–C (Table 43) were added thereto, and the blends were cooked over moderate heat for 15 minutes to obtain chikuzen-ni samples.

With respect to the resulting samples, the organoleptic evaluation by 20 taste-panelists was performed using a 2-point comparison method in various combinations. The results appear in Table 44 and show that the chikuzen-ni of the invention (sample C) provides significantly suppressed "acidic taste" compared to the product with the addition of sodium acetate (sample B) and the overall taste and flavor were also improved.

It was further shown that the chikuzen-ni of the invention (sample C) provided approximately the same evaluation in the overall preferable taste and flavor compared to the non-addition product (sample A).

As an additional test, samples B and C were stored at 15° C. for 48 hours, and the number of general microorganisms was counted. The resulting number of microorganisms was almost unchanged in both of the samples (<100/g).

TABLE 43

| Raw ingredients | | Sample A | Sample B | Sample C |
|---|---|---|---|---|
| taros | | 130 g | 130 g | 130 g |
| bamboo shoot | | 60 | 60 | 60 |
| lotus root | | 50 | 50 | 50 |
| carrot | | 50 | 50 | 50 |
| mushrooms | | 50 | 50 | 50 |
| burdock root | | 25 | 25 | 25 |
| chicken (breast) | | 200 | 200 | 200 |
| konnyaku (konjak) | | 150 | 150 | 150 |
| Seasoning solution | strong-tasting soy sauce | 50 | 50 | 50 |
| | granulated sugar | 43 | 43 | 43 |
| | sake | 28 | 28 | 28 |
| | sweet sake | 34 | 34 | 34 |
| | "Honzukuri Ichiban Dashi" Katsuo | 50 | 50 | 50 |
| | Salad Keep-80 | — | 15 | 15 |
| | sorbitol | — | — | 0.5 |
| | MSG | — | — | 1 |
| | potassium chloride | — | — | 0.3 |
| | disodium inosinate 7.5-hydrate | — | — | 0.2 |
| | water | 450 | 435 | 433 |

TABLE 44

| Evaluation item | Run 1 A:B | Run 2 B:C | Run 3 A:C |
|---|---|---|---|
| preferable flavor | 14:6 | 7:13 | 10:10 |
| preferable taste | 14:6 | 7:13 | 9:11 |
| stronger acidic taste | 5:15 | 14:6 | 9:11 |
| overall preferable | 13:7 | 6:14 | 9:11 |

*There is a significant difference with a significance level of 5%.

Example 21

Various types of hamburger (i.e., hamburg; hamburg steak) were prepared by the following process. Seasoning preparations and food recipes were as shown in Table 45.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

In a usual manner, raw ingredients were mixed, and both surfaces were then fried in salad oil to obtain a hamburger sample.

With respect to the resulting samples, the organoleptic evaluation by 20 taste-panelists was performed using a 2-point comparison method in various combinations. The results appear in Table 46 and show that the hamburger of the invention (sample C) provides significantly suppressed "acidic taste" compared to the product with the addition of sodium acetate (sample B) and the overall taste and flavor were also improved.

It was further shown that the nikujaga of the invention (sample C) provided approximately the same evaluation in the overall preferable taste and flavor compared to the non-addition product (sample A).

TABLE 45

| Raw ingredients | Sample A | Sample B | Sample C |
|---|---|---|---|
| ground beef | 400 g | 400 g | 400 g |
| ground pork | 400 | 400 | 400 |
| onion | 500 | 500 | 500 |
| whipped egg | 100 | 100 | 100 |
| bread crumb | 44 | 44 | 44 |
| milk | 90 | 90 | 90 |
| table salt | 11 | 11 | 11 |
| pepper | 0.4 | 0.4 | 0.4 |
| Salad Keep-80 | — | 15.5 | 15.5 |
| sorbitol | — | — | 1 |
| MSG | — | — | 0.5 |
| potassium chloride | — | — | 0.3 |
| disodium inosinate 7.5-hydrate | — | — | 0.2 |

TABLE 46

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |
| overall preferable | 17:3* | 4:16* | 11:9 |

*There is a significant difference with a significance level of 5%.

Example 22

Various types of gyoza were prepared by the following process. Seasoning preparations and food recipes were as shown in Table 47.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

In a usual manner, raw ingredients were blended, and the blend was packed in dough, and fried in salad oil to obtain a gyoza sample.

With respect to the resulting samples, the organoleptic evaluation by 20 taste-panelists was performed using a 2-point comparison method in various combinations. The results appear in Table 48 and show that the gyoza of the invention (sample C) provides significantly suppressed "acidic taste" compared to the product with the addition of sodium acetate (sample B) and the overall taste and flavor were also improved.

It was further shown that the gyoza of the invention (sample C) provided approximately the same evaluation in the overall preferable taste and flavor compared to the non-addition product (sample A).

TABLE 47

| Raw ingredients | Sample A | Sample B | Sample C |
|---|---|---|---|
| ground pork | 250 g | 250 g | 250 g |
| welsh onion | 100 | 100 | 100 |
| chinese cabbage | 400 | 400 | 400 |
| ginger | 15 | 15 | 15 |
| leek | 30 | 30 | 30 |
| garlic | 10 | 10 | 10 |
| strong-tasting soy sauce | 34 | 34 | 34 |
| sesame oil | 21 | 21 | 21 |

TABLE 47-continued

| Raw ingredients | Sample A | Sample B | Sample C |
|---|---|---|---|
| sake | 14 | 14 | 14 |
| table salt | 3 | 3 | 3 |
| pepper | 0.4 | 0.4 | 0.4 |
| Salad Keep-80 | — | 9 | 9 |
| sorbitol | — | — | 0.8 |
| MSG | — | — | 0.6 |
| potassium chloride | — | — | 0.3 |
| disodium inosinate 7.5-hydrate | — | — | 0.1 |

TABLE 48

| Evaluation item | Run 1 A:B | Run 2 B:C | Run 3 A:C |
|---|---|---|---|
| preferable flavor | 14:6 | 7:13 | 10:10 |
| preferable taste | 14:6 | 7:13 | 12:8 |
| stronger acidic taste | 5:15 | 14:6 | 12:8 |
| overall preferable | 13:7 | 6:14 | 12:8 |

*There is a significant difference with a significance level of 5%.

Example 23

Various types of cooked (boiled) rice were prepared by the following process. Seasoning preparations and food recipes were as shown in Table 49.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

In a usual manner, raw ingredients were blended, and the blend was cooked under ordinary rice-cooking conditions to obtain a cooked (boiled) rice sample.

With respect to the resulting samples, the organoleptic evaluation by 20 taste-panelists was performed using a 2-point comparison method in various combinations. The results appear in Table 50 and show that the cooked rice of the invention (sample C) provides significantly suppressed "acidic taste" compared to the product with the addition of sodium acetate (sample B) and the overall taste and flavor were also improved.

It was further shown that the cooked rice of the invention (sample C) provided approximately the same evaluation in the overall preferable taste and flavor compared to the non-addition product (sample A).

TABLE 49

| Raw ingredients | Sample A | Sample B | Sample C |
|---|---|---|---|
| rice | 6 cups | 6 cups | 6 cups |
| chicken | 140 g | 140 g | 140 g |
| carrot | 100 | 100 | 100 |
| konnyaku (konjak) | 100 | 100 | 100 |
| fried bean curd | 50 | 50 | 50 |
| burdock root | 100 | 100 | 100 |
| dry mushrooms | 30 | 30 | 30 |
| "Honzukuri Ichiban Dashi" Katsuo | 100 | 100 | 100 |
| sake | 50 | 50 | 50 |
| strong-tasting soy sauce | 18 | 18 | 18 |
| table salt | 4 | 4 | 4 |
| Salad Keep-80 | — | 30 | 30 |

TABLE 49-continued

| Raw ingredients | Sample A | Sample B | Sample C |
|---|---|---|---|
| sorbitol | — | — | 1.5 |
| MSG | — | — | 1.2 |
| potassium chloride | — | — | 1 |
| disodium inosinate 7.5-hydrate | — | — | 0.3 |
| water | 1300 | 1270 | 1266 |

TABLE 50

| Evaluation item | Run 1 A:B | Run 2 B:C | Run 3 A:C |
|---|---|---|---|
| preferable flavor | 14:6 | 7:13 | 10:10 |
| preferable taste | 14:6 | 7:13 | 12:8 |
| stronger acidic taste | 5:15 | 14:6 | 12:8 |
| overall preferable | 13:7 | 6:14 | 12:8 |

*There is a significant difference with a significance level of 5%.

Example 24

Various types of cream stew were prepared by the following process using a commercial cream stew roux (made by House Foods Corporation). Seasoning preparations and food recipes were as shown in Table 51.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

An onion, chicken and a carrot were fried in salad oil, and further fried with the addition of potatoes. Water (or sodium acetate) was added thereto, and the blend was cooked over moderate heat for 20 minutes. The commercial cream stew roux was added thereto, and the blend was further heated over low heat for 10 minutes to obtain a cream stew sample.

With respect to the resulting samples, the organoleptic evaluation by 20 taste-panelists was performed using a 2-point comparison method in various combinations. The results appear in Table 52 and show that the cream stew of the invention (sample C) provides significantly suppressed "acidic taste" compared to the product with the addition of sodium acetate (sample B) and the overall taste and flavor were also improved.

It was further shown that the cream stew of the invention (sample C) provided approximately the same evaluation in the overall preferable taste and flavor compared to the non-addition product (sample A).

As an additional test, samples B and C were stored at 15° C. for 48 hours, and the number of general microorganisms was counted. The resulting number of microorganisms was almost unchanged in both of the samples (<100/g).

TABLE 51

| Raw ingredients | Sample A | Sample B | Sample C |
|---|---|---|---|
| potatoes | 600 g | 600 g | 600 g |
| onion | 800 | 800 | 800 |
| carrot | 200 | 200 | 200 |
| chicken (breast) | 500 | 500 | 500 |

TABLE 51-continued

| Raw ingredients | | Sample A | Sample B | Sample C |
|---|---|---|---|---|
| salad oil | | 42 | 42 | 42 |
| Seasoning solution | stew roux (made by House Foods Corporation) | 228 | 228 | 228 |
| | Salad Keep-80 | — | 45 | 45 |
| | sorbitol | — | — | 2 |
| | MSG | — | — | 2.5 |
| | potassium chloride | — | — | 1 |
| | disodium inosinate 7.5-hydrate | — | — | 0.5 |
| | water | 2000 | 1955 | 1949 |

TABLE 52

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |
| overall preferable | 17:3* | 4:16* | 11:9 |

*There is a significant difference with a significance level of 5%.

Example 25

Various types of curry were prepared using a commercial curry roux (made by House Foods Corporation). Seasoning preparations and food recipes were as shown in Table 53.

Specifically, sample A is a non-addition product, sample B is a product with the addition of a sodium acetate preparation, and sample C is the inventive product containing sodium acetate, a sugar alcohol, glutamic acid, potassium, and inosinic acid. Salad Keep-80 (containing 40% of sodium acetate) made by Okuno Chemical Industries Co., Ltd. was used as a sodium acetate preparation.

An onion, pork meat and a carrot were fried in salad oil, and further fried with the addition of potatoes. Water (or sodium acetate) was added thereto, and the blend was cooked over moderate heat for 20 minutes. The commercial curry roux was added thereto, and the blend was further heated over low heat for 10 minutes to obtain a curry sample.

With respect to the resulting samples, the organoleptic evaluation by 20 taste-panelists was performed using a 2-point comparison method in various combinations. The results appear in Table 54 and show that the curry of the invention (sample C) provides significantly suppressed "acidic taste" compared to the product with the addition of sodium acetate (sample B) and the overall taste and flavor were also improved.

It was further shown that the gyoza of the invention (sample C) provided approximately the same evaluation in the overall preferable taste and flavor compared to the non-addition product (sample A).

TABLE 53

| Raw ingredients | | Sample A | Sample B | Sample C |
|---|---|---|---|---|
| potatoes | | 300 g | 300 g | 300 g |
| onion | | 600 | 600 | 600 |
| carrot | | 200 | 200 | 200 |
| pork | | 400 | 400 | 400 |
| salad oil | | 28 | 28 | 28 |
| Seasoning solution | curry roux (made by House Foods Corporation) | 200 | 200 | 200 |
| | Salad Keep-80 | — | 30 | 30 |

TABLE 53-continued

| Raw ingredients | Sample A | Sample B | Sample C |
|---|---|---|---|
| sorbitol | — | — | 1 |
| MSG | — | — | 2 |
| potassium chloride | — | — | 0.7 |
| disodium inosinate 7.5-hydrate | — | — | 0.3 |
| water | 1100 | 1070 | 1066 |

TABLE 54

| Evaluation item | Run 1 A:B | Run 2 B:C | Run 3 A:C |
|---|---|---|---|
| preferable flavor | 14:6 | 7:13 | 11:9 |
| preferable taste | 14:6 | 7:13 | 12:8 |
| stronger acidic taste | 5:15 | 14:6 | 12:8 |
| overall preferable | 13:7 | 6:14 | 11:9 |

*There is a significant difference with a significance level of 5%.

Example 26

Various types of cooked (fried) vegetables were prepared by the following process. Vegetables shown in Recipe Table 55 were fried in salad oil, and seasonings were added thereto to obtain a sample of cooked vegetables.

With respect to the resulting samples, the organoleptic evaluation by 20 taste-panelists was performed using a 2-point comparison method in various combinations. The results appear in Table 56 and show that the product of the invention (sample C) provides significantly suppressed "acidic taste" compared to the product with the addition of sodium acetate (sample B) and the overall taste and flavor were also improved.

It was further shown that the product of the invention (sample C) provided approximately the same evaluation in the overall preferable taste and flavor compared to the non-addition product (sample A).

TABLE 55

| Raw ingredients | Sample A | Sample B | Sample C |
|---|---|---|---|
| pork belly (fine slices) | 360 g | 360 g | 360 g |
| cabbage | 600 | 600 | 600 |
| onion | 360 | 360 | 360 |
| soybean sprouts | 300 | 300 | 300 |
| green pepper | 180 | 180 | 180 |
| table salt | 15 | 15 | 15 |
| pepper | 1.2 | 1.2 | 1.2 |
| Salad Keep-80 | — | 15 | 15 |
| sorbitol | — | — | 0.8 |
| MSG | — | — | 0.4 |
| potassium chloride | — | — | 0.3 |
| disodium inosinate 7.5-hydrate | — | — | 0.1 |

TABLE 56

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 1:19* | 18:2* | 8:12 |
| overall preferable | 17:3* | 4:16* | 11:9 |

*There is a significant difference with a significance level of 5%.

Example 27

Various types of thick cooked roll egg were prepared by the following process. Raw ingredients shown in Recipe Table 57 were mixed, and then fried to obtain a sample of a thick cooked roll egg.

With respect to the resulting samples, the organoleptic evaluation by 20 taste-panelists was performed using a 2-point comparison method in various combinations. The results appear in Table 58 and show that the product of the invention (sample C) provides significantly suppressed "acidic taste" compared to the product with the addition of sodium acetate (sample B) and the overall taste and flavor were also improved.

It was further shown that the product of the invention (sample C) provided approximately the same evaluation in the overall preferable taste and flavor compared to the non-addition product (sample A).

TABLE 57

| Raw ingredients | Sample A | Sample B | Sample C |
|---|---|---|---|
| egg (whole egg) | 200 g | 200 g | 200 g |
| water | 40 | 40 | |
| "Honzukuri Ichiban Dashi" Katsuo | 10 | 10 | |
| table salt | 1.3 | 1.3 | |
| light-tasting soy sauce | 6 | 6 | |
| sweet sake | 6 | 6 | |
| Salad Keep-80 | — | 2.5 | 2.5 |
| sorbitol | — | — | 0.3 |
| MSG | — | — | 0.15 |
| potassium chloride | — | — | 0.1 |
| disodium inosinate 7.5-hydrate | — | — | 0.05 |

TABLE 58

| Evaluation item | Run 1 A:B | Run 2 B:C | Run 3 A:C |
|---|---|---|---|
| preferable flavor | 18:2* | 6:14 | 12:8 |
| preferable taste | 18:2* | 5:15 | 11:9 |
| stronger acidic taste | 2:18* | 17:3* | 7:13 |
| overall preferable | 17:3* | 4:16* | 13:7 |

*There is a significant difference with a significance level of 5%.

Example 28

A cooked (boiled) food of a lotus root was prepared using a commercial lotus root. Seasoning preparations and food recipes were as shown in Table 59.

Specifically, sample A is a non-addition product, sample B is a product with the addition of vinegar, and sample C is the inventive product containing vinegar, a sugar alcohol, glutamic acid, potassium, and inosinic acid. Grain vinegar made by Mitsukan Co., Ltd. was used as a vinegar preparation.

The lotus root was peeled, cut to a thickness of approximately 5 mm, dipped in a vinegar solution (20-fold dilute solution of a grain vinegar) for 10 minutes, and then washed with running water. Raw ingredients of seasoning solutions A–C (Table 59) were mixed in a pot (pan), and the mixtures were heated. After boiling, the lotus root was added the seasoning solutions, and heated under gentle boiling conditions for 10 minutes to obtain lotus root cooked (boiled) food samples.

With respect to the resulting samples, the organoleptic evaluation by 20 taste-panelists was performed using a 2-point comparison method in various combinations. The results appear in Table 60 and show that the product of the invention (sample C) provides significantly suppressed "acidic taste" compared to the product with the addition of vinegar (sample B) and the overall taste and flavor were also improved.

It was further shown that the product of the invention (sample C) provided approximately the same evaluation in the overall preferable taste and flavor compared to the non-addition product (sample A).

TABLE 59

| Raw ingredients | | Sample A | Sample B | Sample C |
|---|---|---|---|---|
| lotus root (after dipped in vinegar solution) | | 200 g | 200 g | 200 g |
| Seasoning solution | light-tasting soy sauce | 17 | 17 | 17 |
| | granulated sugar | 15 | 15 | 15 |
| | sake | 15 | 15 | 15 |
| | table salt | 2.6 | 2.6 | 2.6 |
| | "Honzukuri Ichiban Dashi" Katsuo | 35 | 35 | 35 |
| | vinegar (grain vinegar) | — | 15 | 15 |
| | sorbitol | — | — | 0.3 |
| | MSG | — | — | 0.5 |
| | potassium chloride | — | — | 0.1 |
| | disodium inosinate 7.5-hydrate | — | — | 0.1 |
| | water | 320 | 314 | 313 |

TABLE 60

| Evaluation item | Run 1 A:B | Run 2 B:C | Run 3 A:C |
|---|---|---|---|
| preferable flavor | 18:2* | 7:13 | 11:9 |
| preferable taste | 17:3* | 5:15 | 11:9 |
| stronger acidic taste | 1:19* | 18:2* | 8:12 |
| overall preferable | 18:2* | 3:17* | 10:10 |

*There is a significant difference with a significance level of 5%.

Example 29

A tuna filet for sandwiches was prepared by blending 150 g of a commercial canned tuna (oil-dipped tuna flakes, made by Hagoromo Foods Corp.), 100 g of a commercial mayonnaise (made by Ajinomoto Co., Inc.), 25 g of onion (chopped), 5 g of a vinegar (a grain vinegar, made by Mitsukan Co., Ltd.), 0.2 g of MSG (sodium L-glutamate), 0.05 g of IN (sodium inosinate), 0.4 g of sorbitol and 0.15 g of potassium chloride. As a control product, a tuna fillet without the addition of MSG, IN, sorbitol and potassium chloride was prepared.

With respect to the tuna filet of the present invention and the control product, the organoleptic evaluation by 20 taste-panelists was performed using a 2-point comparison method in various combinations. The results appear in Table 61 and show that the tuna filet of the invention provides significantly suppressed "acidic taste" compared to the control product and the overall taste and flavor were also improved.

TABLE 61

| Evaluation Item | Invention product | Control |
|---|---|---|
| preferable flavor | 12 | 8 |
| preferable taste | 17* | 3 |
| stronger acidic taste | 2 | 18* |
| overall preferable | 17* | 3 |

*There is a significant difference with a significance level of 5%.

Example 30

A potato salad was prepared according to the following recipe (composition). Four-hundred grams of potatoes were heated under boiling conditions for 20 minutes, and allowed to cool. Then, 100 g of commercial mayonnaise (made by Ajinomoto Co., Inc.), 50 g of onion (chopped), 30 g of cucumber (fine slices), 10 g of a vinegar (a grain vinegar, made by Mitsukan Co., Ltd.), 1.0 g of MSG, 0.4 g of IN (sodium inosinate), 1.5 g of sorbitol and 0.3 g of potassium chloride were blended to prepare a potato salad of the present invention. As a control product, a potato salad without the addition of MSG, IN, sorbitol and potassium chloride was prepared.

With respect to the potato salad of the present invention and the control product, the organoleptic evaluation by 20 taste-panelists was performed using a 2-point comparison method in various combinations. The results appear in Table 62 and show that the potato salad of the invention provides significantly suppressed "acidic taste" compared to the control product and the overall taste and flavor were also improved.

TABLE 62

| Evaluation Item | Invention product | Control |
| --- | --- | --- |
| preferable flavor | 11 | 9 |
| preferable taste | 18* | 2 |
| stronger acidic taste | 1 | 19* |
| overall preferable | 18* | 2 |

*There is a significant difference with a significance level of 5%.

Example 31

A noodle soup was prepared by mixing 250 ml of "Honkaeshi", made by Higeta Shoyu Co., Ltd., 100 ml of "Honzukuri Ichiban Dashi" Katsuo (made by Ajinomoto Co., Inc.), 650 ml of a city water, 0.2 g of sodium acetate, 0.8 g of MSG, 0.4 g of IN (sodium inosinate), 1.0 g of mannitol and 0.2 g of potassium chloride. As a control product, a noodle soup without the addition of MSG, IN, sorbitol and potassium chloride was prepared.

With respect to the noodle soup of the present invention and the control product, the organoleptic evaluation by 20 taste-panelists was performed using a 2-point comparison method in various combinations. The results appear in Table 63 and show that the noodle soup of the invention provides significantly suppressed "acidic taste" compared to the control product and the overall taste and flavor were also improved.

TABLE 63

| Evaluation Item | Invention product | Control |
| --- | --- | --- |
| preferable flavor | 11 | 9 |
| preferable taste | 18* | 2 |
| stronger acidic taste | 1 | 19* |
| overall preferable | 18* | 2 |

*There is a significant difference with a significance level of 5%.

Example 32

Two kinds of cooked food of taros (sato-imo; i.e., boiled taros) were prepared using a recipe shown in Table 64. Specifically, each sample contained as an ingredient an inoculum of (1) without microorganisms; (2) *Bacillus subtilis* of 100 cells/g; or (3) *Escherichia coli* of 300 cells/g. These samples were then stored at 20° C. for 72 hours. The number of general living microorganisms in each sample were counted by standard methods. The results appear in Table 65.

As demonstrated in Table 65, the sample of without microorganisms and the microorganism inoculated samples (both *Bacillus subtilis* and *Escherichia coli*), an increase in microorganism quantity was not observed in the Sample A (present inventive composition). In contrast, an increase in microorganism quantity was observed for all samples in the Sample B (control).

Based on these results, it is understood that the food excellent in preservative quality can be provided by the present invention.

TABLE 64

| | Raw ingredients | Sample A | Sample B |
| --- | --- | --- | --- |
| | Frozen taros (after being washed) | 380 g | 380 g |
| Seasoning solution | Light-tasting soy sauce | 15 | 15 |
| | Granulated sugar | 13 | 13 |
| | Sake | 13 | 13 |
| | Table salt | 2.2 | 2.2 |
| | "Honzukuri Ichiban Dashi" Katsuo | 30 | 30 |
| | Salad Keep-80 | 2 | — |
| | Salad Keep-TEX* | 2 | — |
| | Sorbitol | 0.3 | — |
| | MSG | 0.5 | — |
| | Potassium chloride | 0.2 | — |
| | Disodium inosinate 7.5-hydrate | 0.1 | — |
| | "Aromate BC" | 0.5 | — |
| | water | 262.8 | 268.4 |

*Sodium acetate preparation containing polylysine

TABLE 65

| kind of inoculated microorganism | Sample | Start | 1$^{st}$ day | 2$^{nd}$ day | 3$^{rd}$ day |
| --- | --- | --- | --- | --- | --- |
| (1) without microorganisms | Sample A | Less than 10 | Less than 10 | Less then 10 | Less than 10 |
| | Sample B | Less than 10 | $4.0 \times 10^4$ | $7.0 \times 10^7$ | — |
| (2) *Bacillus subtilis* | Sample A | $1.1 \times 10^2$ | 80 | 40 | Less than 10 |
| | Sample B | 60 | $5.2 \times 10^4$ | $1.0 \times 10^8$ | — |
| (3) *Escherichia coli* | Sample A | $3.0 \times 10^2$ | $1.6 \times 10^2$ | Less than 10 | Less than 10 |
| | Sample B | $3.0 \times 10^2$ | $6.2 \times 10^4$ | $9.5 \times 10^7$ | — |

Numerous modifications and variations on the present invention are possible in light of the above teachings. It is, therefore, to be understood that within the scope of the accompanying claims, the invention may be practiced otherwise than as specifically described herein.

We claim:

1. A seasoning composition comprising, in a weight ratio, 0.01 to 0.5 of sugar alcohol(s), 0.05 to 1.0 of glutamic acid, 0.001 to 0.2 of potassium, 0.0005 to 0.2 of inosinic acid, and 0.01 to 1.5 of an acetate per 100 based on the weight of a food or drink free from of the seasoning composition or ingredients thereof.

2. The seasoning composition of claim 1, wherein the glutamic acid is in the form of a salt.

3. The seasoning composition of claim 1, wherein the glutamic acid is selected from the group consisting of L-glutamic acid, sodium L-glutamate, potassium L-glutamate, and calcium L-glutamate.

4. The seasoning composition of claim 1, wherein the inosinic acid is in the form of a salt.

5. The seasoning composition of claim 1, wherein the inosinic acid is in the form of a salt selected from the group consisting of sodium inosinate, disodium inosinate, potassium inosinate, calcium inosinate, and histidine inosinate.

6. The seasoning composition of claim 1, wherein the potassium is in the form of a salt or a compound.

7. The seasoning composition of claim 1, wherein the potassium is selected from the group consisting of potassium chloride, an anhydride of monopotassium dihydrogenphosphate, a hydrate of monopotassium dihydrogenphosphate, an anhydride of dipotassium monohydrogenphosphate, a hydrate of dipotassium monohydrogenphosphate, potassium hydroxide, and potassium glutamate.

8. The seasoning composition of claim 1, further comprising a sulfur-containing compound.

9. The seasoning composition of claim 8, wherein the sulfur-containing compound is one or more sulfur-containing amino acids or sulfur-containing peptides.

10. The seasoning composition of claim 8, wherein the sulfur-containing compound is selected from the group consisting of cysteine, a hydrochloride of cysteine, cystine, methionine, a hydrolyzed protein, γ-glutamylcysteine, glutathione, and a glutathione-containing yeast extract.

11. The seasoning composition of claim 8, wherein the weight ratio of the sulfur-containing compound is 0.0001 to 0.1 in terms of a sulfur molecule.

12. The seasoning composition of claim 1, wherein the acetate ion is in the form of acetic acid or a salt.

13. The seasoning composition of claim 1, wherein said composition comprises, in a weight ratio, 2 to 50 of sugar alcohol(s), 15 to 250 of glutamic acid, 1 to 50 of potassium and 0.2 to 20 of inosinic acid, relative to 100 of the acetate ion.

14. The seasoning composition of claim 13, further comprising, in a weight ratio relative to 100 of the acetate ion, 0.01 to 30 of a sulfur-containing compound in terms of a sulfur molecule.

15. The seasoning composition of claim 1, wherein the acetate ion is sodium acetate or derived therefrom.

16. The seasoning composition of claim 15, wherein said composition comprises, in a weight ratio, 2 to 20 of sugar alcohol(s), 15 to 150 of glutamic acid, 2 to 20 of potassium and 0.2 to 10 of inosinic acid relative to 100 of the sodium acetate.

17. The seasoning composition of claim 16, further comprising, in a weight ratio relative to 100 of the acetate ion, 0.01 to 30 of a sulfur-containing compound in terms of a sulfur molecule.

18. The seasoning composition of claim 1, wherein said acetate ion is in a weight ratio of 0.02 to 1.0.

19. The seasoning composition of claim 1, wherein said potassium is in a weight ratio of 0.005 to 0.2 and said inosinic acid is in a weight ratio of 0.001 to 0.2.

20. The seasoning composition of claim 19, wherein said acetate ion is in a weight ratio of 0.05 to 1.5.

21. A food or drink comprising, in a weight ratio, 0.01 to 0.5 of sugar alcohol(s), 0.05 to 1.0 of glutamic acid, 0.001 to 0.2 of potassium, 0.0005 to 0.2 of inosinic acid, 0.01 to 1.5 of an acetate ion, and 100 of a food or drink.

22. The food or drink of claim 21, further comprising a sulfur-containing compound.

23. The food or drink of claim 22, wherein the weight ratio of the sulfur-containing compound relative to 100 of the food or drink, is 0.0001 to 0.1 in terms of a sulfur molecule.

24. The food or drink of claim 21, which comprises, in a weight ratio, 2 to 50 of sugar alcohol(s), 15 to 250 of glutamic acid, 1 to 50 of potassium and 0.2 to 20 of inosinic acid, relative to 100 of the acetate ion.

25. The food or drink of claim 21, which comprises, in a weight ratio, 3 to 30 of sugar alcohol(s), 22 to 220 of glutamic acid, 3 to 30 of potassium and 0.3 to 15 of inosinic acid, relative to 100 of the acetate ion.

26. The food or drink of claim 21, which comprises, in a weight ratio, 2 to 20 of sugar alcohol(s), 15 to 150 of glutamic acid, 2 to 20 of potassium and 0.2 to 10 of inosinic acid, relative to 100 of sodium acetate.

27. The food or drink of claim 21, which comprises, in a weight ratio, 0.01 to 30 of sulfur-containing amino acid(s) and/or sulfur-containing peptide(s) in terms of a sulfur molecule relative to 100 of the acetate ion.

28. The food or drink of claim 21, wherein the food is a pre-cooked daily-food.

29. The food or drink of claim 21, wherein the food is one or more foods selected from the group consisting of a Japanese cooked food, a Japanese boiled food, a deep-fried food, a Japanese pre-cooked food, a Chinese food, a Western food and a rice food.

30. The food or drink of claim 21, wherein the food is one or more foods selected from the group consisting of nikujaga, chikuzen-ni, kara-age, pork cutlet, tamagoyaki, a baked fish, chuka-don, chahan, mabo-dofu, happo-sai, gyoza, curry, beef stew, white stew, steak soup, sauce, a seasoning sauce, ketchup, a dressing, onigiri, and rice pilaf.

31. A method comprising, adding a seasoning composition comprising, in a weight ratio, 0.01 to 0.5 of sugar alcohol(s), 0.05 to 1.0 of glutamic acid, 0.001 to 0.2 of potassium, 0.0005 to 0.2 of inosinic acid, and 0.01 to 1.5 of an acetate ion based on a weight of 100 of a food or drink free from of the seasoning composition or ingredients thereof, to a food or drink during the production thereof.

32. The method of claim 31, wherein the seasoning composition further comprises a sulfur-containing compound.

33. The method of claim 32, wherein the weight ratio of the sulfur-containing compound relative to 100 of the food or drink, is 0.0001 to 0.1 in terms of a sulfur molecule.

* * * * *